US012459499B2

(12) United States Patent
Baba et al.

(10) Patent No.: US 12,459,499 B2
(45) Date of Patent: Nov. 4, 2025

(54) MOBILE OBJECT CONTROL DEVICE, MOBILE OBJECT CONTROL METHOD, AND STORAGE MEDIUM

(71) Applicant: HONDA MOTOR CO., LTD., Tokyo (JP)

(72) Inventors: Ichiro Baba, Wako (JP); Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 239 days.

(21) Appl. No.: 17/582,031

(22) Filed: Jan. 24, 2022

(65) Prior Publication Data

US 2022/0234577 A1 Jul. 28, 2022

(30) Foreign Application Priority Data

Jan. 26, 2021 (JP) .................. 2021-009983

(51) Int. Cl.
*G06F 17/00* (2019.01)
*B60W 30/09* (2012.01)
(Continued)

(52) U.S. Cl.
CPC ............. *B60W 30/09* (2013.01); *G06V 20/58* (2022.01); *B60Q 9/008* (2013.01); *B60W 2420/403* (2013.01); *B60W 2420/408* (2024.01)

(58) Field of Classification Search
CPC ............. B60W 30/09; B60W 2420/42; B60W 2420/52; B60W 30/16; B60W 30/08;
(Continued)

(56) References Cited

U.S. PATENT DOCUMENTS 5,758,298 A * 5/1998 Guldner ............... G05D 1/0255
701/25
6,259,979 B1 * 7/2001 Holmquist ........... G05D 1/0236
342/126
(Continued)

FOREIGN PATENT DOCUMENTS

CN 106991664 7/2017
CN 109997090 7/2019
(Continued)

OTHER PUBLICATIONS

Ellipsoid tether model for collision avoidance in a fleet of ROVs—(Year: 2024).*
(Continued)

*Primary Examiner* — Ronnie M Mancho
(74) *Attorney, Agent, or Firm* — Amin, Turocy & Watson, LLP

(57) ABSTRACT

A mobile object control device recognizes an object which is located near a vehicle, generates a movement plan for the vehicle, which includes generation of a target trajectory in which the vehicle is to travel and which is obtained by connecting a plurality of trajectory points, and generates, when generating the movement plan, the target trajectory such that a line which is obtained by connecting trajectory points adjacent to each other with respect to a traveling direction of the vehicle does not pass through a risk area including the recognized object.

7 Claims, 16 Drawing Sheets

(51) Int. Cl.
*G06V 20/58* (2022.01)
*B60Q 9/00* (2006.01)

(58) Field of Classification Search
CPC .. B60W 30/095; B60W 30/10; B60W 30/001; B60W 2420/403; B60W 2420/408; B60W 60/0015; B60W 60/001; G06V 20/58; G06V 20/54; B60Q 9/008; G05D 1/0212
USPC .......................................................... 701/26
See application file for complete search history.

(56) References Cited

U.S. PATENT DOCUMENTS

| | | | | |
|---|---|---|---|---|
| 6,816,632 | B1* | 11/2004 | Slice | .................... G06V 10/478 |
| | | | | 382/293 |
| 2017/0132930 | A1* | 5/2017 | Ando | ..................... G08G 1/163 |
| 2019/0049974 | A1 | 2/2019 | Kato | |
| 2020/0385017 | A1 | 12/2020 | Baba et al. | |
| 2020/0385020 | A1 | 12/2020 | Komuro | |
| 2021/0046925 | A1* | 2/2021 | Bonkoski | .............. B60W 30/09 |
| 2021/0114617 | A1* | 4/2021 | Phillips | .............. G01C 21/3453 |
| 2021/0163068 | A1* | 6/2021 | Zhu | ................... B62D 15/0285 |
| 2021/0362706 | A1 | 11/2021 | Horiguchi et al. | |
| 2022/0198809 | A1 | 6/2022 | Oami et al. | |
| 2022/0234577 | A1* | 7/2022 | Baba | ...................... G06V 20/58 |

FOREIGN PATENT DOCUMENTS

| | | | | |
|---|---|---|---|---|
| CN | 111133489 | A * | 5/2020 | .............. B60Q 1/50 |
| CN | 111204336 | | 5/2020 | |
| CN | 111942378 | | 11/2020 | |
| CN | 111942379 | | 11/2020 | |
| CN | 112172809 | | 1/2021 | |
| JP | 2011221667 | A * | 11/2011 | |
| JP | 2014136480 | A * | 7/2014 | ............ B60W 30/00 |
| JP | 2019-034627 | | 3/2019 | |
| JP | 2020-045024 | | 3/2020 | |
| WO | 2014/181647 | | 11/2014 | |
| WO | 2018/097465 | | 5/2018 | |
| WO | 2020/213105 | | 10/2020 | |

OTHER PUBLICATIONS

Japanese Office Action for Japanese Patent Application No. 2021-009983 mailed May 14, 2024.
Chinese Office Action for Chinese Patent Application No. 202210083669.6 mailed Apr. 23, 2025.

* cited by examiner

MOBILE OBJECT CONTROL DEVICE, MOBILE OBJECT CONTROL METHOD, AND STORAGE MEDIUM

CROSS-REFERENCE TO RELATED APPLICATION

Priority is claimed on Japanese Patent Application No. 2021-009983 filed on Jan. 26, 2021, the content of which is incorporated herein by reference.

BACKGROUND

Field of the Invention

The present invention relates to a mobile object control device, a mobile object control method, and a storage medium.

Description of Related Art

Automated traveling of a mobile object such as a vehicle (hereinafter referred to as "automated driving") has been researched and put into practical use. In automated driving, a target trajectory is required to be generated automatically based on a situation of the traveling direction of the mobile object.

In this regard, Japanese Unexamined Patent Application, First Publication No. 2019-34627 discloses a vehicle control device including: a first setter that sets a first potential for a plurality of subareas into which a road area is divided on the basis of the road area; a second setter that sets a second potential for the subareas on the basis of a nearby object detected by a detector; an evaluator that derives an index value obtained by evaluating a potential of a subarea of interest out of the plurality of subareas on the basis of the first potential and the second potential set for the subarea of interest and prediction information generated for a nearby subarea selected from the vicinity of the subarea of interest; and a selector that selects one or more subareas in a traveling direction of a vehicle from the plurality of subareas on the basis of the index value derived by the evaluator.

SUMMARY

It is difficult to generate the target trajectory of automated driving as a continuous curve, and thus it is expected that the target trajectory is generated by a polygonal chain obtained by connecting points (trajectory points). The trajectory points have a moderate length of interval, and thus, in the related art, a risk area relating to an object having a small risk size may exist between trajectory points, with the result that the mobile object is determined to travel outside of the risk area irrespective of the fact that the target trajectory passes through the risk area and the risk of the target trajectory is not evaluated appropriately in some cases.

The invention is made in consideration of the above circumstances, and an object thereof is to provide a mobile object control device, a mobile object control method, and a storage medium, which are capable of evaluating a target trajectory appropriately and controlling a mobile object while suppressing increase in calculation load.

A mobile object control device, a mobile object control method, and a storage medium according to the invention employ the following configurations.

(1) A mobile object control device according to an aspect of the invention includes: a storage device that stores a program; and a hardware processor, the hardware processor executing the program stored in the storage device to: recognize an object which is located near a vehicle; generate a movement plan for the vehicle, which includes generation of a target trajectory in which the vehicle is to travel and which is obtained by connecting a plurality of trajectory points; and generate, when generating the movement plan, the target trajectory such that a line which is obtained by connecting trajectory points adjacent to each other with respect to a traveling direction of the vehicle does not pass through a risk area including the recognized object.

(2) In the aspect of (1), the hardware processor sets the risk area to have an ellipse shape.

(3) In the aspect of (2), the hardware processor performs deformation processing of converting the ellipse to a circle for the risk area set to have an ellipse shape, the deformation processing including shrinking the risk area and the line in a major axis direction of the ellipse or enlarging the risk area and the line in a minor axis direction of the ellipse, evaluates a degree of closeness of the target trajectory to the object based on a result of performing the deformation processing, and generates the target trajectory based on a result of the evaluation.

(4) In the aspect of (3), the hardware processor performs, before the deformation processing, rotation processing of rotating the risk area and the line around a center of the ellipse and matching the major axis and the minor axis of the ellipse with axes of the virtual plane.

(5) A mobile object control method to be executed by a computer mounted on a mobile body according to another aspect of the invention includes: recognizing an object which is located near a vehicle; generating a movement plan for the vehicle, which includes generation of a target trajectory in which the vehicle is to travel and which is obtained by connecting a plurality of trajectory points; and generating, when generating the movement plan, the target trajectory such that a line which is obtained by connecting trajectory points adjacent to each other with respect to a traveling direction of the vehicle does not pass through a risk area including the recognized object.

(6) A computer-readable non-transitory storage medium according to another aspect of the invention stores a program for causing a computer mounted on a mobile body to: recognize an object which is located near a vehicle; generate a movement plan for the vehicle, which includes generation of a target trajectory in which the vehicle is to travel and which is obtained by connecting a plurality of trajectory points; and generate, when generating the movement plan, the target trajectory such that a line which is obtained by connecting trajectory points adjacent to each other with respect to a traveling direction of the vehicle does not pass through a risk area including the recognized object.

According to the aspects of (1) to (6), it is possible to flexibly generate a target trajectory in various scenes.

DESCRIPTION OF EMBODIMENTS

In the following, a mobile object control device, a mobile object control method, and a storage medium according to an embodiment of the invention will be described with reference to the accompanying drawings. The following description relates to vehicle as a representative example of the mobile object. However, the mobile object is not limited to a vehicle, and can be applied to any type of mobile object that moves autonomously, such as micromobility and robots (including those with wheels and those that walk on multiple legs).

First Embodiment

[Entire Configuration]

Figure 1:
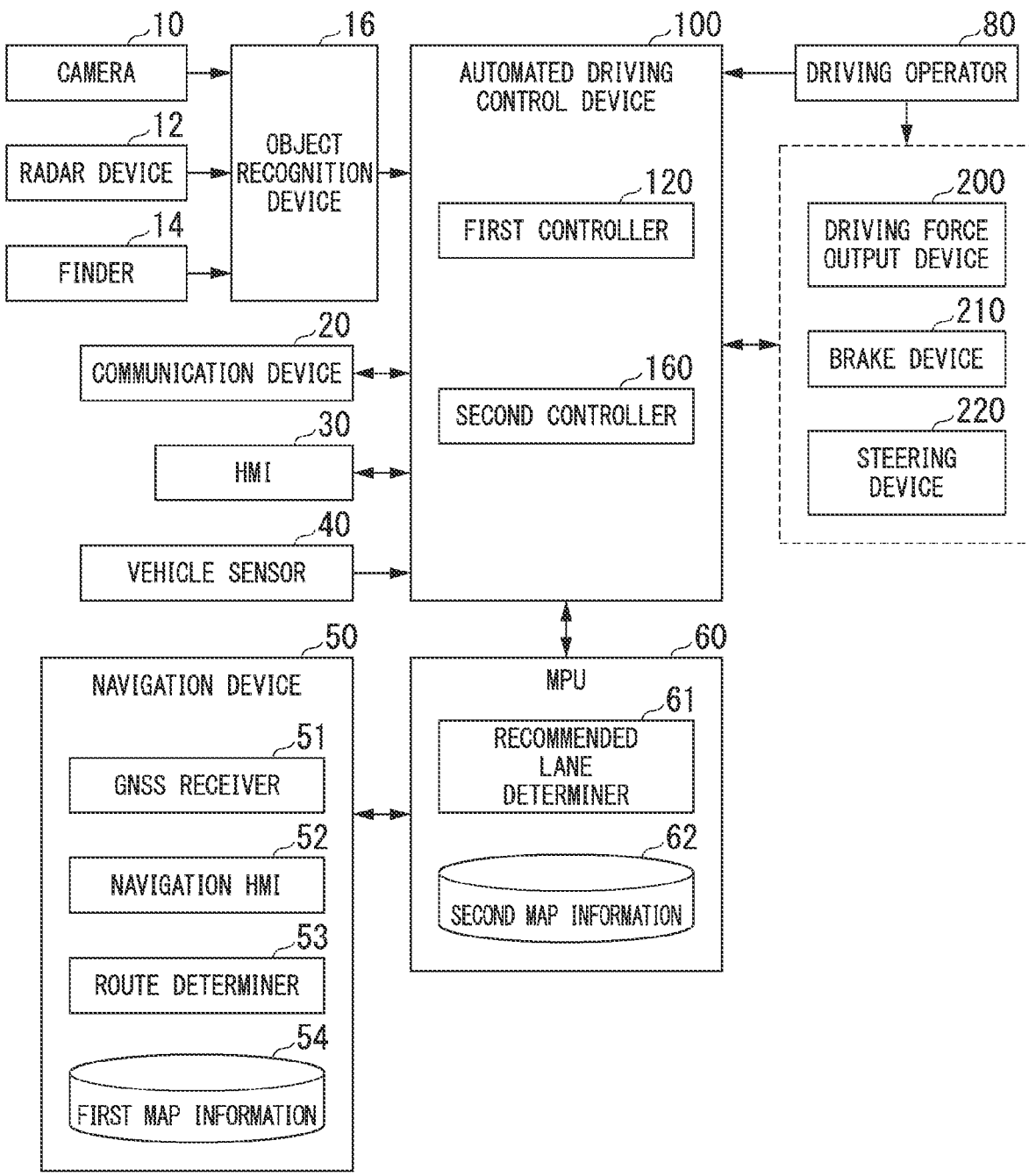
FIG. 1 is a diagram illustrating a configuration of a vehicle system employing a vehicle control device according to an embodiment.

FIG. 1 is a diagram illustrating a configuration of a vehicle system employing a vehicle control device according to an embodiment. A vehicle in which the vehicle system 1 is mounted is, for example, a vehicle with two wheels, three wheels, or four wheels and a drive source thereof is an internal combustion engine such as a diesel engine or a gasoline engine, an electric motor, or a combination thereof. The electric motor operates using electric power which is generated by a power generator connected to the internal combustion engine or electric power which is discharged from a secondary battery or a fuel cell.

The vehicle system 1 includes, for example, a camera 10, a radar device 12, a finder 14, an object recognition device 16, a communication device 20, a human-machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or instruments are connected to each other via a multiplex communication line such as a controller area network (CAN) communication line, a serial communication line, a radio communication network, or the like. The elements illustrated in FIG. 1 are only an example and some of the elements may be omitted or another element may be added thereto.

The camera 10 is, for example, a digital camera using a solid-state imaging device such as a charge-coupled device (CCD) or a complementary metal oxide semiconductor (CMOS). The camera 10 is attached to an arbitrary position on a vehicle (hereinafter referred to as a host vehicle M) in which the vehicle system 1 is mounted. When a scene in front of the vehicle M is imaged, the camera 10 is attached to an upper part of a front windshield, a rear surface of a rearview mirror, or the like. The camera 10 images surroundings of the host vehicle M, for example, periodically and repeatedly. The camera 10 may be a stereoscopic camera.

The radar device 12 radiates radio waves such as millimeter waves to the surroundings of the host vehicle M and detects at least a position (a distance and a direction) of an object by detecting radio waves (reflected waves) reflected by the object. The radar device 12 is attached to an arbitrary position on the host vehicle M. The radar device 12 may detect a position and a speed of an object using a frequency modulated continuous wave (FM-CW) method.

The finder 14 is a Light Detection And Ranging device (LIDAR). The finder 14 applies light to the surroundings of the host vehicle M and measures scattered light. The finder 14 detects a distance to an object on the basis of a time from emission of light to reception of light. The light which is applied is, for example, a pulse-like laser beam. The finder 14 is attached to an arbitrary position on the host vehicle M.

The object recognition device 16 performs a sensor fusion process on results of detection from some or all of the camera 10, the radar device 12, and the finder 14 and recognizes a position, a type, a speed, and the like of an object. The object recognition device 16 outputs the result of recognition to the automated driving control device 100. The object recognition device 16 may output the results of detection from the camera 10, the radar device 12, and the finder 14 to the automated driving control device 100 without any change. The object recognition device 16 may be omitted from the vehicle system 1.

The communication device 20 communicates with another vehicle near the host vehicle M, for example, using a cellular network, a Wi-Fi network, Bluetooth (registered trademark), or dedicated short range communication (DSRC), or various server devices via a radio base station.

The HMI 30 presents various types of information to an occupant of the host vehicle M and receives an input operation from the occupant. The HMI 30 includes various display devices, speakers, buzzers, touch panels, switches, and keys.

The vehicle sensor 40 includes a vehicle speed sensor that detects a speed of the host vehicle M, an acceleration sensor that detects acceleration, a yaw rate sensor that detects an angular velocity around a vertical axis, and a direction sensor that detects a direction of the host vehicle M.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the host vehicle M on the basis of signals received from GNSS satellites. The position of the host vehicle M may be identified or complemented by an inertial navigation system (INS) using the output of the vehicle sensor 40. The navigation HMI 52 includes a display device, a speaker, a touch panel, and keys. All or a part of the navigation HMI 52 may be shared by the HMI 30. For example, the route determiner 53 determines a route (hereinafter a route on a map) from the position of the host vehicle M identified by the GNSS receiver 51 (or an input arbitrary position) to a destination input by an occupant using the navigation HMI 52 with reference to the first map information 54. The first map information 54 is, for example, information in which road shapes are expressed by links indicating roads and nodes connected by the links. The first map information 54 may include a curvature of a road or point of interest (POI) information. The route on a map is output to the MPU 60. The navigation device 50 may perform guidance for a route using the navigation HMI 52 on the basis of the route on a map. The navigation device 50 may be realized, for example, by a function of a terminal device such as a smartphone or a tablet terminal which is carried by an occupant. The navigation device 50 may transmit a current position and a destination to a navigation server via the communication device 20 and may acquire a route which is equivalent to the route on a map from the navigation server.

The MPU 60 includes, for example, a recommended lane determiner 61 and stores second map information 62 in a storage device such as an HDD or a flash memory. The recommended lane determiner 61 divides the route on a map supplied from the navigation device 50 into a plurality of blocks (for example, every 100 [m] in a vehicle traveling direction) and determines a recommended lane for each block with reference to the second map information 62. The recommended lane determiner 61 determines in which lane from the leftmost the vehicle will travel. When there is a branching point in the route on a map, the recommended lane determiner 61 determines a recommended lane such that the host vehicle M travels on a rational route for traveling to a branching destination.

The second map information 62 is map information with higher precision than the first map information 54. The second map information 62 includes, for example, information of the center of a lane or information of boundaries of a lane. The second map information 62 may include road information, traffic regulation information, address information (addresses and postal codes), facility information, and phone number information. The second map information 62 may be updated from time to time by communicating with another device using the communication device 20.

The driving operator 80 includes, for example, an accelerator pedal, a brake pedal, a shift lever, a steering wheel, a deformed steering, a joystick, and other operators. A sensor that detects an amount of operation or performing of an operation is attached to the driving operator 80, and results of detection thereof are output to some or all of the automated driving control device 100, the travel driving force output device 200, the brake device 210, and the steering device 220.

The automated driving control device 100 is an example of a vehicle control device. The automated driving control device 100 includes, for example, a first controller 120 and a second controller 160. The first controller 120 and the second controller 160 are realized, for example, by causing a hardware processor such as a central processing unit (CPU) to execute a program (software). Some or all of such elements may be realized in hardware (which includes circuitry) such as a large scale integration (LSI), an application specific integrated circuit (ASIC), or a field-programmable gate array (FPGA), or a graphics processing unit (GPU) or may be realized in cooperation of software and hardware. The program may be stored in a storage device such as an HDD or a flash memory of the automated driving control device 100 (a storage device including a non-transitory storage medium) in advance, or may be installed in the HDD or the flash memory of the automated driving control device 100 by storing the program in a detachable storage medium (the non-transitory storage medium) such as a DVD or a CD-ROM and attaching the storage medium to a drive device.

Figure 2:
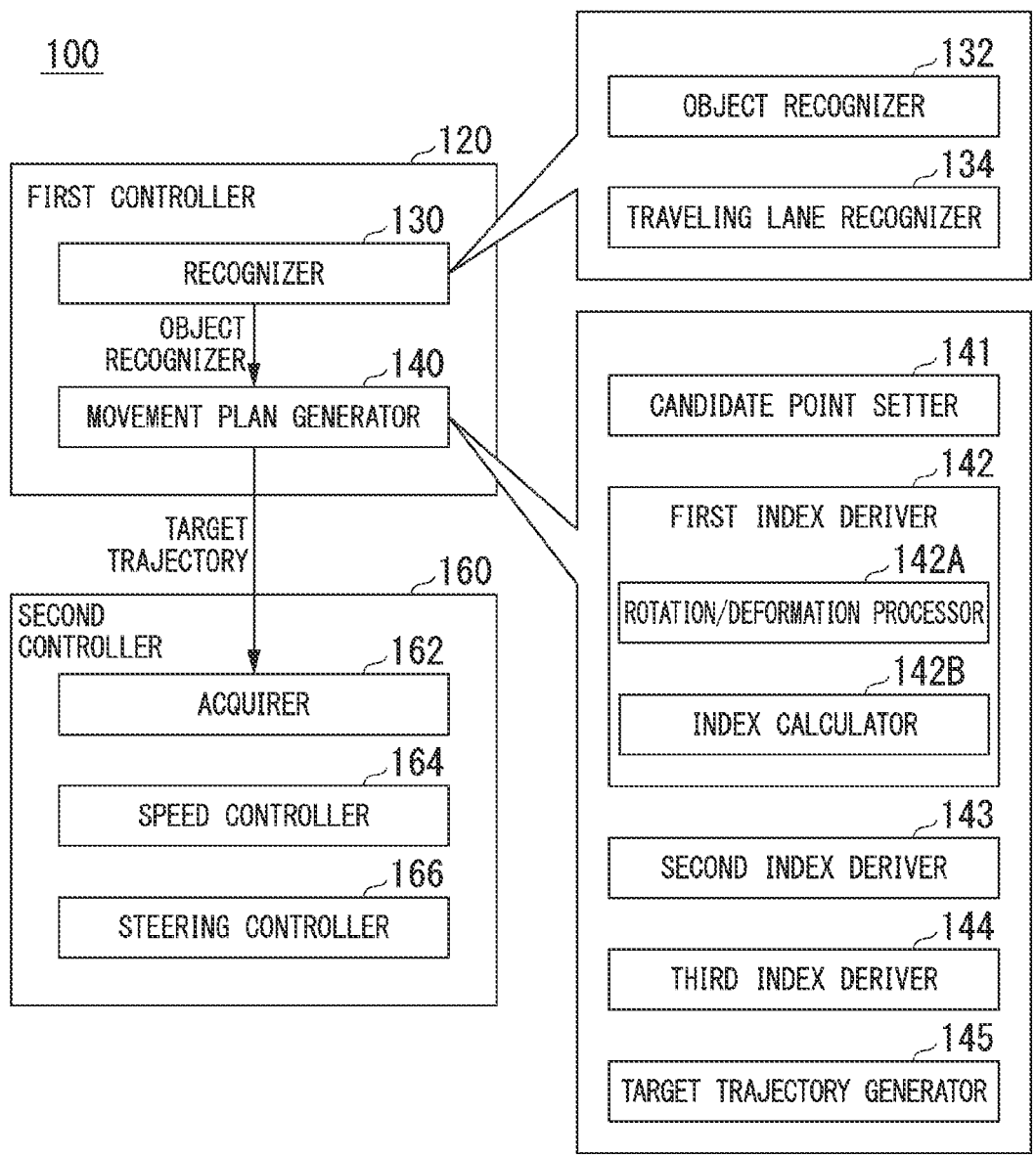
FIG. 2 is a diagram illustrating functional configurations of a first controller and a second controller.

FIG. 2 is a diagram illustrating functional configurations of the first controller and the second controller. The first controller 120 includes, for example, a recognizer 130 and a movement plan generator 140. The first controller 120 is realized, for example, by an artificial intelligence function and a function using a function based on artificial intelligence (AI) and a function based on a predetermined model in cooperation. For example, a function of "recognizing a crossing" may be embodied by performing recognition of a crossing based on deep learning or the like and recognition based on predetermined conditions (such as signals which can be pattern-matched and road signs) in cooperation, scoring both recognitions, and comprehensively evaluating both recognitions. Accordingly, reliability of automated driving is secured.

The recognizer 130 includes, for example, an object recognizer 132 and a traveling lane recognizer 134. The object recognizer 132 recognizes states such as a position, a speed, and acceleration of an object near the host vehicle M on the basis of information which is input from the camera 10, the radar device 12, and the finder 14 via the object recognition device 16. The object includes both of a stationary object and a moving object. For example, a position of an object is recognized as a position in an absolute coordinate system with an origin set to a representative point of the host vehicle M (such as the center of gravity or the center of a drive shaft) and is used for control. A position of an object may be expressed as a representative point such as the center of gravity or a corner of the object or may be expressed as a drawn area. A "state" of an object may include an acceleration or a jerk of the object or a "moving state" (for example, whether lane change is being performed or whether lane change is going to be performed) thereof.

The traveling lane recognizer 134 recognizes, for example, a relative position of a lane (a traveling lane) in which the host vehicle M is traveling with respect to the host vehicle M. For example, the traveling lane recognizer 134 recognizes the traveling lane by comparing a pattern of road markings near the host vehicle M which are recognized from an image captured by the camera 10 with a pattern of road markings (for example, arrangement of a solid line and a dotted line) which are acquired from the second map information 62. The recognizer 130 may recognize the traveling lane by recognizing a traveling road boundary (a road boundary) including road markings, edges of a roadside, a curbstone, a median, and a guard rail as well as the road markings. In this recognition, the position of the host vehicle M acquired from the navigation device 50 and the result of processing from the INS may be considered.

The traveling lane recognizer 134 recognizes a position or a direction of the host vehicle M with respect to a traveling lane at the time of recognition of the traveling lane. The traveling lane recognizer 134 may recognize, for example, separation of a reference point of the host vehicle M from the lane center and an angle of the traveling direction of the host vehicle M with respect to a line formed by connecting the lane centers as the position and the direction of the host vehicle M relative to the traveling lane. Instead, the traveling lane recognizer 134 may recognize a position of the reference point of the host vehicle M relative to one side line of the traveling lane (a road marking or a road boundary) or the like as the position of the host vehicle M relative to the traveling lane.

The movement plan generator 140 includes, for example, a candidate point setter 141, a first index deriver 142, a second index deriver 143, a third index deriver 144, and a target trajectory generator 145. Some or all of the candidate point setter 141, the first index deriver 142, the second index deriver 143, and the third index deriver 144 may be included in the recognizer 130.

The movement plan generator 140 generates a target trajectory in which the host vehicle M will travel automatedly (without requiring a driver's operation) in the future such that the host vehicle M travels in a recommended lane which is determined by the recommended lane determiner 61 in principle and copes with surrounding circumstances of the host vehicle M. The target trajectory generator 145 generates the target trajectory on the basis of a first index which is derived by the first index deriver 142, a second index which is derived by the second index deriver 143, and a third index which is derived by the third index deriver 144. Details thereof will be described later.

For example, a target trajectory is expressed by sequentially arranging (connecting) points (trajectory points) at which a representative point (for example, the center of the front, the center of gravity, or the center between the rear wheels) of the host vehicle M will arrive at intervals of a predetermined distance (for example, about several [m]) in the road length direction. A target speed and target acceleration at intervals of a predetermined sampling time (for example, about below the decimal point [sec]) are added to the target trajectory. Trajectory points may be positions at which the host vehicle M is to arrive at predetermined sampling times every sampling time. In this case, information of the target speed or the target acceleration is expressed by intervals between the trajectory points.

The second controller 160 controls the travel driving force output device 200, the brake device 210, and the steering device 220 such that the host vehicle M passes along the target trajectory generated by the movement plan generator 140 as scheduled.

The second controller 160 includes, for example, an acquirer 162, a speed controller 164, and a steering controller 166. The acquirer 162 acquires information of a target trajectory (trajectory points) which is generated by the movement plan generator 140 and stores the acquired information in a memory (not illustrated). The speed controller 164 controls the travel driving force output device 200 or the brake device 210 on the basis of a speed element pertained to the target trajectory stored in the memory. The steering controller 166 controls the steering device 220 on the basis of a curved state of the target trajectory stored in the memory. The processes of the speed controller 164 and the steering controller 166 are embodied, for example, by feed-forward control and feedback control in combination. For example, the steering controller 166 performs feed-forward control based on a curvature of a road in front of the host vehicle M and feedback control based on separation from the target trajectory in combination.

The travel driving force output device 200 outputs a travel driving force (a torque) for allowing the host vehicle to travel to the driving wheels. The travel driving force output device 200 includes, for example, a combination of an internal combustion engine, an electric motor, and a transmission and an electronic control unit (ECU) that controls them. The ECU controls the above-mentioned configuration on the basis of information input from the second controller 160 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of the information input from the second controller 160 or the information input from the driving operator 80 such that a brake torque based on a braking operation is output to vehicle wheels. The brake device 210 may include a mechanism for transmitting a hydraulic pressure generated by an operation of a brake pedal included in the driving operator 80 to the cylinder via a master cylinder as a backup. The brake device 210 may be an electronically controlled hydraulic brake device that controls an actuator on the basis of the information input from the second controller 160 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of the information input from the second controller 160 or the information input from the driving operator 80 to change the direction of the turning wheels.

[Generation of Target Trajectory]

The method of generating a target trajectory will be described below in more detail.

The first index deriver 142 derives a first index R (a risk) that has a more negative value as the vehicle becomes closer to an object recognized by the object recognizer 132 for each line (hereinafter referred to as "candidate line") connecting a plurality of candidate points (points) in the traveling direction of the host vehicle M and correlates the derived first index with the corresponding candidate points of the plurality of candidate points. "Correlates" means, for example, being stored as correlated information in the memory. In this embodiment, a plus value is defined as being "negative," a value close to zero is defined as being "positive," and a score which will be described later is defined as having a more positive value (a more preferable value) as the value becomes closer to zero, and vice versa. Accordingly, the first index deriver 142 derives the first index R that has a smaller value as the vehicle becomes closer to an object recognized by the object recognizer 132 for each of a plurality of candidate lines in the traveling direction of the host vehicle M. The first index deriver 142 includes a rotation/deformation processor 142A and an index calculator 142B. The functions of those sub-functional unit are described later.

The second index deriver 143 derives a second index B (a benefit) that has a smaller (more positive) value as the vehicle becomes closer to a recommended trajectory which is set in a predetermined rule for each of a plurality of candidate points in the traveling direction of the host vehicle M and correlates the derived second index with the corresponding candidate of the plurality of candidate points.

Figure 3:
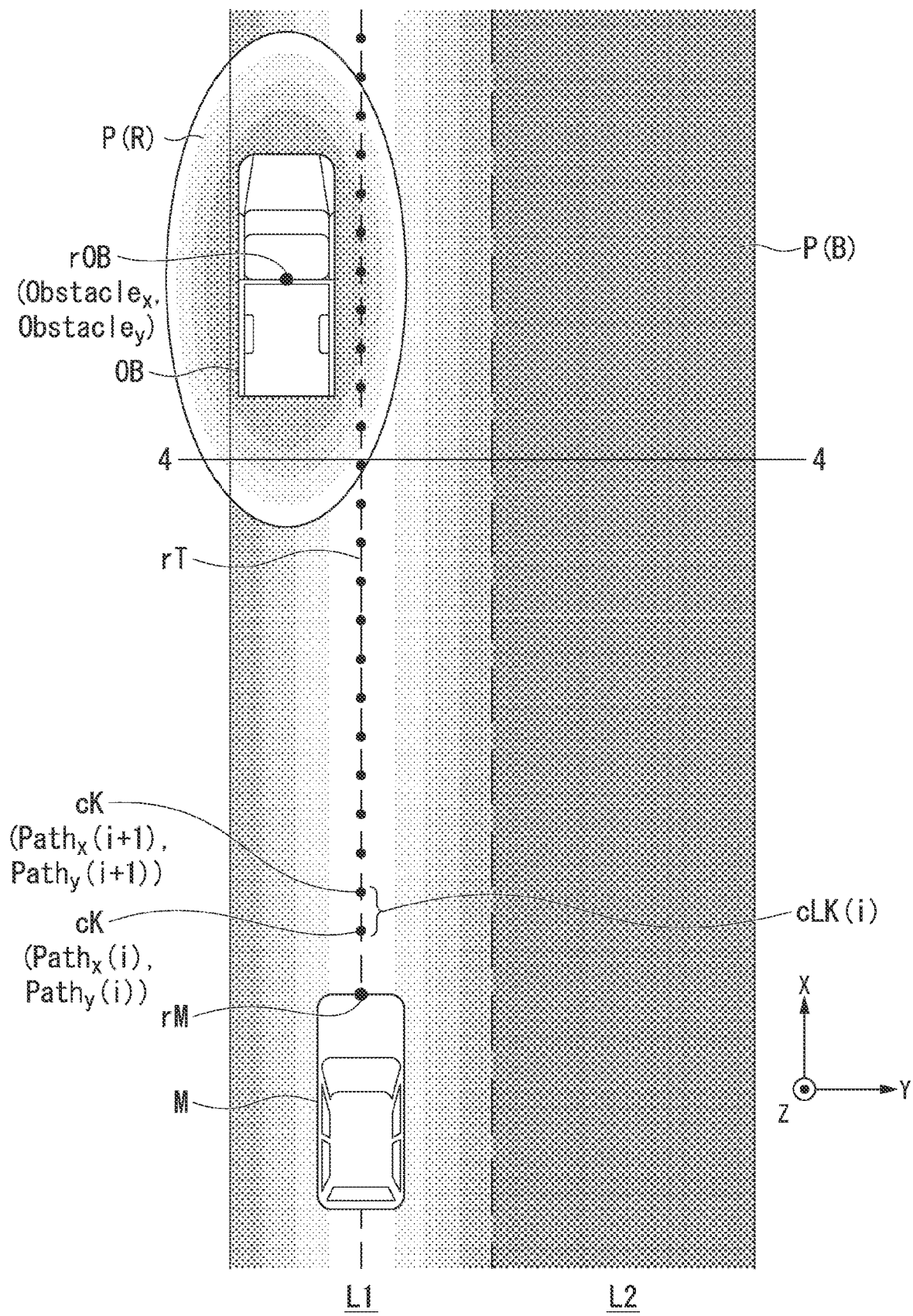
FIG. 3 is a diagram illustrating candidate points, a first index, and a second index.

FIG. 3 is a diagram illustrating candidate points, the first index, and the second index. In the drawing, reference sign rT denotes a recommended route. The second index deriver 143 sets the center line of the recommended lane (L1 in FIG. 3) which is determined by the recommended lane determiner 61 as the recommended route rT. The invention is not limited thereto, and the second index deriver 143 may set a line which is biased to one of the right and left sides in the recommended lane as the recommended route rT. In a curved road, the recommended route has a curved shape. When the movement plan generator 140 changes the lane of the host vehicle M, a route which is directed from a certain lane to another adjacent lane may be set as the recommended route rT.

In the drawing, reference sign cK denotes a candidate point. The candidate point setter 141 sets a plurality of candidate points cK on a road in the traveling direction of the host vehicle M such that each candidate point has a width in a road length direction (an X direction) and a road width direction (a Y direction). A line connecting candidate points cK, which are adjacent to each other in the X direction, is a candidate line cLK. In the following description, the road length direction is referred to as a longitudinal direction and the road width direction is referred to as a lateral direction. In principle, the candidate point setter 141 sets a plurality of candidate points $cK(Path_x(i), Path_y(i))$ at intervals of a predetermined distance from the representative point rM of the host vehicle M on the recommended route rT (where i=1, 2, ..., N), changes a position in the lateral direction of each candidate point cK by a predetermined width, and comprehensively sets the candidate points cK. The factor i is, for example, a value which is set in a receding order from the representative point of the host vehicle M. A candidate line connecting the candidate point $cK(Path_x(i), Path_y(i))$ and the candidate point $cK(Path_x(i+1), Path_y(i+1))$ is defined as a candidate line cLK(i). A line connecting the candidate points cK in the longitudinal direction is a candidate (temporary trajectory) for a target trajectory and the candidate points cK constituting the determined temporary trajectory, namely, the target trajectory are trajectory points. The candidate points cK on the recommended route rT may be referred to as a base path. As will be described later, the method of setting the candidate points cK is not limited to the searching method in the lateral direction with respect to the base path, and may employ a method of performing searching on the basis of a previous target trajectory.

In the drawing, reference sign OB denotes an object which is recognized by the object recognizer 132, and reference sign P(R) denotes a distribution of the first index R. In the drawing, a dark part represents having a large value. The first index deriver 142 assumes an ellipse with respect to a representative point rOB of the object OB, for example, and derives the first index R for each candidate line cLK(i) such that the first index increases as a point of the candidate line cLK(i), which is closest to the representative point rOB, becomes closer to the center of the ellipse and decreases as the point becomes further away from the representative point rOB (i=1 to n). In the following description, the coordinates of the representative point rOB are expressed as $(Object_x, Object_y)$. The distribution P(R) of the first index R is derived to have an elliptical shape having a major axis in a desired direction in view of a certain contour line of values. The ratio between a major axis and a minor axis of the ellipse is changed, for example, depending on the length of the object OB in the longitudinal direction or the type of the object OB. An outer edge line of the ellipse in which the first index R is zero is expressed as eOB. The desired direction is, for example, an expected direction of movement of the object OB (in the case of a vehicle or a bicycle, the direction of the vehicle's axle or the direction of the wheels), or is the direction of extension of the road or the direction of travel of the vehicle when the object OB is a stationary object. These "directions" are recognized by the object recognizer 132, for example. The desired direction is not limited thereto, but the desired direction may be determined in any way. Depending on the type of object OB, the distribution P(R) of the first index R may be set so that the contour lines of the values have the shape of a circle or have other shapes.

In the drawing, reference sign P(B) denotes a distribution of the second index B. In the drawing, a dark part represents having a large value. The second index deriver 143 derives the second index B that has a more positive value as it becomes closer to the recommended route rT (or the base path) for each candidate point cK.

Figure 4:
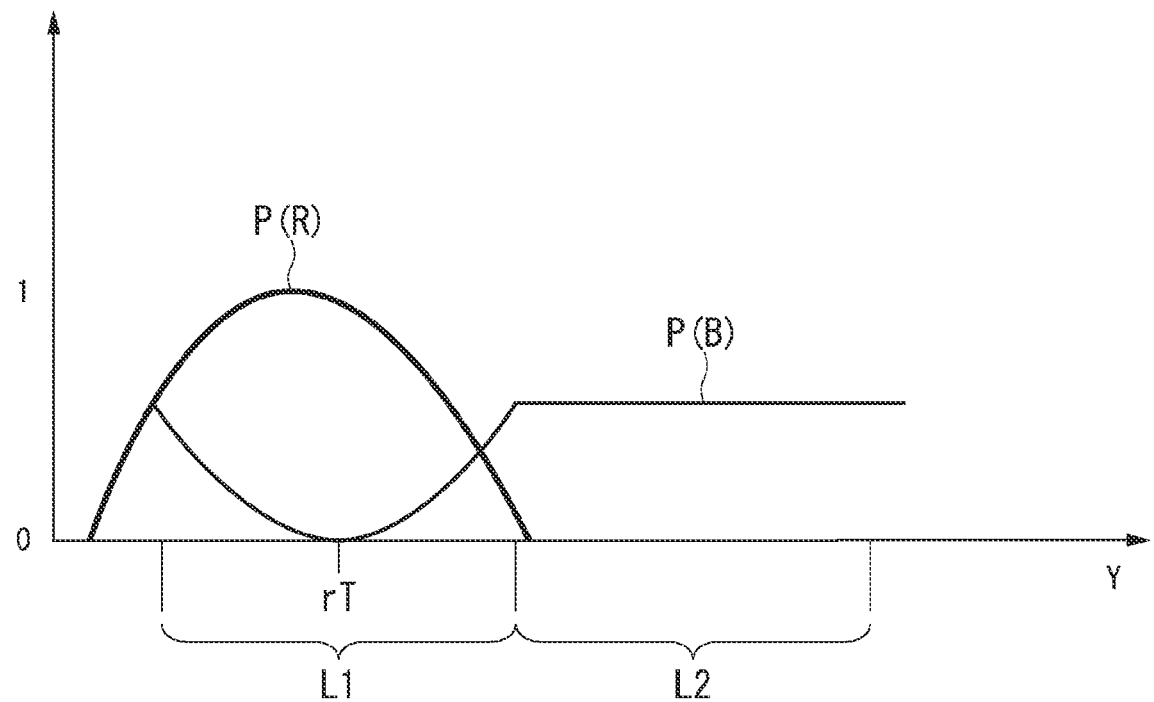
FIG. 4 is a diagram illustrating an example of a distribution of the first index and a distribution of the second index in a cross-section taken along line 4-4 in FIG. 3.

FIG. 4 is a diagram illustrating a distribution P(R) of the first index R and a distribution P(B) of the second index B in a cross-section taken along line 4-4 in FIG. 3. The distribution P(R) of the first index R represents a distribution which has a peak at the position in the lateral direction of the center rOB of the object OB, has a smaller value as it becomes further away from the peak, and is zero when it becomes sufficiently far away from the peak. The distribution P(B) of the second index B is a distribution which is zero at the position in the lateral direction of the recommended route rT, has a larger value as it becomes further away from the recommended route rT, and has a constant value in an area of a lane L2 adjacent to a recommended lane L1 (which may also have a larger value as it becomes further away from the recommended route rT in the area of the lane L2 instead). The distribution P(B) of the second index B may be set such that it decreases in the vicinity of the center line of the lane L2.

Figure 5:
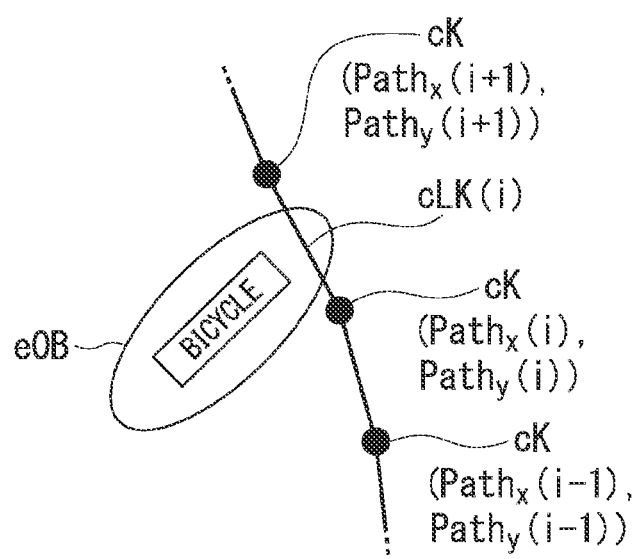
FIG. 5 is a diagram illustrating a reason why the first index is calculated for a candidate line.

The reason for calculating the first index R not for the candidate point cK but for the candidate line cLK will be described below in more detail. FIG. 5 is a diagram illustrating a reason why the first index R is calculated for the candidate line cLK. In FIG. 5, the i-th candidate point $cK(Path_x(i), Path_y(i))$ and the (i+1)-th candidate point $cK(Path_x(i+1), Path_x(i+1))$ are both outside the outer edge eOB of the ellipse where the first index R is zero, and if the first index R is calculated for the candidate point cK, the illustrated candidate for the target trajectory is not penalized by the first index R. However, when the host vehicle M actually travels along this candidate target trajectory, as can be seen from the fact that the candidate line cLK(i) passes through the inside of the outer edge line eOB of the ellipse, the representative point of the host vehicle M may pass through the inside of the outer edge line eOB of the ellipse, resulting in an undesirable situation. When the interval between the candidate point cK and a trajectory point K is set sufficiently narrow, the frequency of occurrence of such issues can be reduced. However, the shorter the interval becomes, the greater the load on the computer processing becomes, and there is a concern that vehicle control may be delayed due to reception of delayed results. Therefore, development is carried out on the premise that the interval between the candidate point cK and the trajectory point K is set to a value with a certain width. In the automatic driving control system 100 (vehicle control system) according to the embodiment, the first index R is calculated for the candidate line cLK to solve such a problem.

Figure 6:
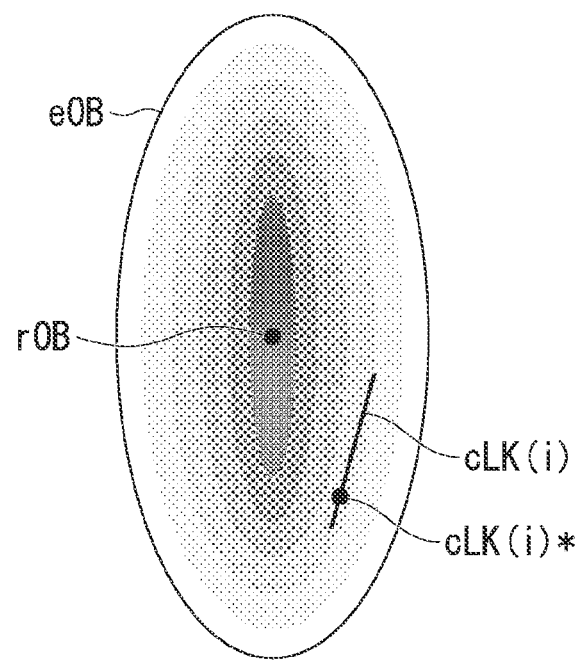
FIG. 6 is a diagram illustrating a principle of calculating the first index for a candidate line.

When determining the first index R for a candidate line cLK, the rule is, for example, as follows. FIG. 6 is a diagram illustrating a principle of calculating the first index R for the candidate line cLK. In principle, the first index deriver 142 draws contour lines of an ellipse shape from the center of the ellipse to the outer edge line eOB, and set a value corresponding to a point (nearest point) on the candidate line cLK, which intersects the innermost contour line, as the first index R for the candidate line cLK. The first index R corresponding to the nearest point is calculated to be closer to 1 as the point becomes closer to the center of the ellipse, and is calculated to be zero on and outside the outer edge eOB of the ellipse. This value can be obtained directly by some calculation method, but the geometric calculation becomes complicated.

Figure 7:
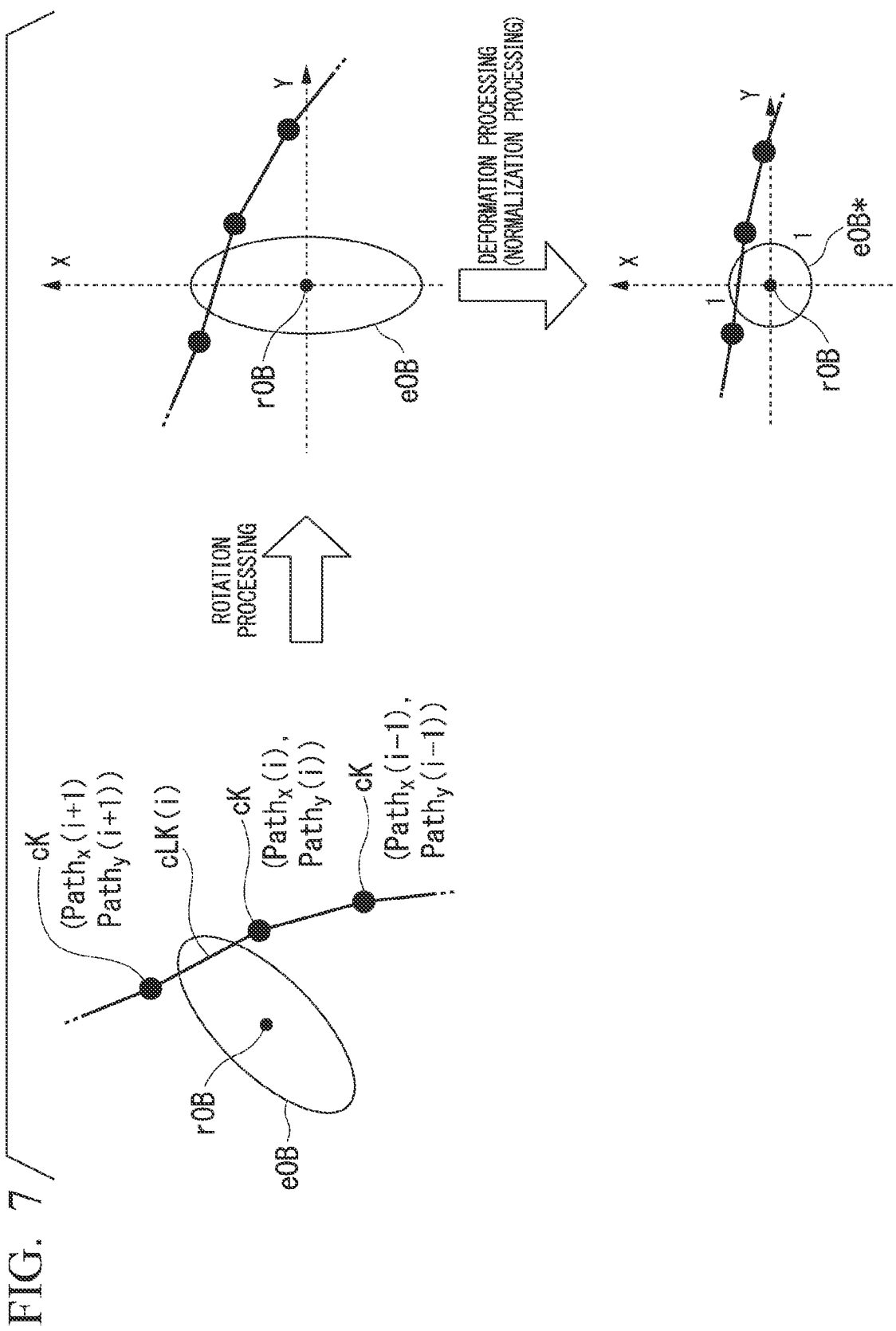
FIG. 7 is a diagram illustrating details of rotation processing and deformation processing.

Therefore, in the embodiment, the rotation/deformation processor 142A and the index calculator 142B perform the processing described below to reduce the calculation load of the first index R. FIG. 7 is a diagram illustrating details of rotation processing and deformation processing. When calculating the first index R for the object OB, the rotation/deformation processor 142A first rotates the ellipse and the candidate line cLK around the center rOB of the ellipse (i.e., the center of the object) so that the major axis and the minor axis of the ellipse, which is the risk area set for the object OB, are aligned with the two axes on a virtual plane for the calculation (in FIG. 7, the axes are assumed to be the same as the XY axes, which are the road coordinate axes, but are not limited thereto). Next, the rotation/deformation processor 142A shrinks the ellipse and candidate line cLK in the major axis direction (or enlarging the ellipse and candidate line cLK in the minor axis direction) so that the length of the major axis of the ellipse matches the length of the minor axis. As a result, the outer edge line eOB of the ellipse becomes the shape of a circle. The rotation/deformation processor 142A further performs the processing of enlarging or shrinking the outer edge line eOB and the candidate line cLK so that the radius of the outer edge line eOB, which has become a circle, becomes 1. The outer edge line eOB* after this rotation and enlargement/shrinking is denoted as eOB*.

Figure 8:
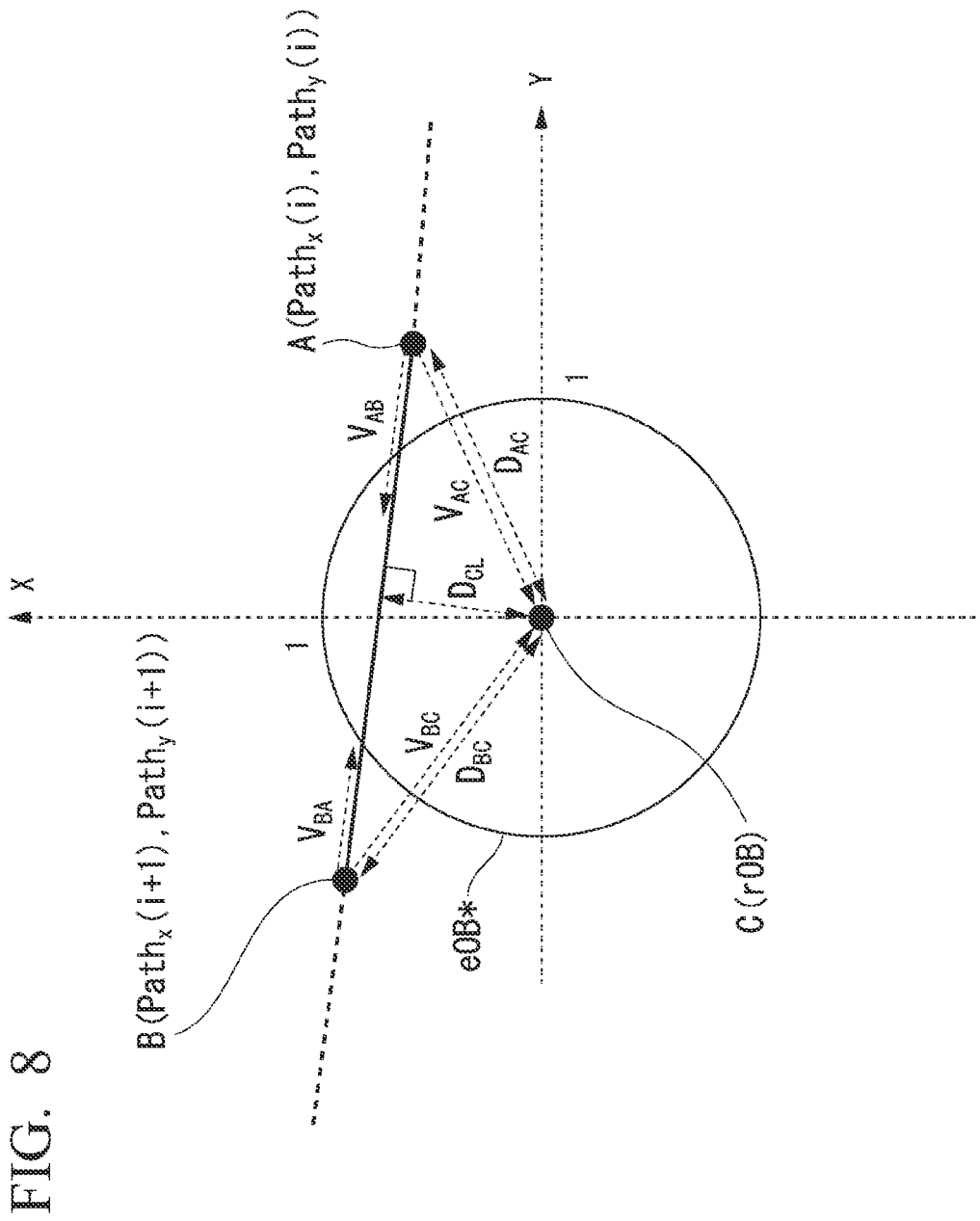
FIG. 8 is a diagram illustrating a condition for determining a flag value.

After the processing, the index calculator 142B determines a flag value Flag(i) for each candidate line cLK. FIG. 8 is a diagram illustrating a condition for determining the flag value Flag(i). In FIG. 8, the end points of some candidate line cLK(i) in focus are denoted as A and B, and the center rOB of the object is denoted as the center point C for description. The index calculator 142B sets the flag value Flag (i) to 1 when at least one of the following conditions 1 and 2 is satisfied, and the condition 3 is satisfied, or sets the flag value Flag (i) to 0 otherwise.

(Condition 1)

The angle $\varphi(V_{AB}/V_{AC})$ between the vector $V_{AB}$ from the endpoint A to the endpoint B and the vector $V_{AC}$ from the endpoint A to the center point C, and the angle $\varphi(V_{BA}/V_{BC})$ between the vector $V_{BA}$ from the endpoint B to the endpoint A and the vector $V_{BC}$ from the endpoint B to the center point C are both acute angles.

(Condition 2)

At least one of the distance $D_{AC}$ between the end point A and the center point C and the distance $D_{BC}$ between the end point B and the center point C is equal to or less than 1

(Condition 3)

The distance $D_{CL}$ between the straight line containing the candidate line cLK(i) and the center point C is equal to or less than 1. The index calculator 142B calculates the distance $D_{CL}$ based on Expression (1). In the following, the distance $D_{CL}$ with respect to the candidate line cLK(i) is denoted as the distance $D_{CL}(i)$.

The index calculator 142B calculates the distance based on Equation (1), and calculates the first index $R_{Path}$ for a certain temporary trajectory based on Expression (2). Expressions (1) and (2) are focused on a single object OB. When a plurality of OBs exist in the vicinity of the temporary trajectory, the index calculator 142B calculates the first indices $R_{Path\_ob1}$, $R_{Path\_ob2}$, ... focusing on each OB based on Expressions (1) and (2), and then calculates the first index $R_{Path}$ by adding those values. It is conceivable that the distance $D_{CL}(i)$ is equal to or less than 1, and the entire candidate line cLK(i) is outside of eOB*. In that state, the conditions 1 and 2 are not satisfied, and thus the term $\{\text{Flag}(i) \times D_{CL}(i)\}$ in $R_{Path}$ becomes zero.

$$D_{CL}(i)=\{\text{Path}_x(i) \times \text{Path}_y(i+1) - \text{Path}_x(i+1) \times \text{Path}_y(i)\}/\sqrt{[\{\text{Path}_x(i+1) - \text{Path}_x(i)\}^2 + \{\text{Path}_y(i+1) - \text{Path}_y(i)\}^2]} \quad (1)$$

$$R_{Path} = \Sigma i=1^N \{\text{Flag}(i) \times D_{CL}(i)\} \quad (2)$$

Figure 9:
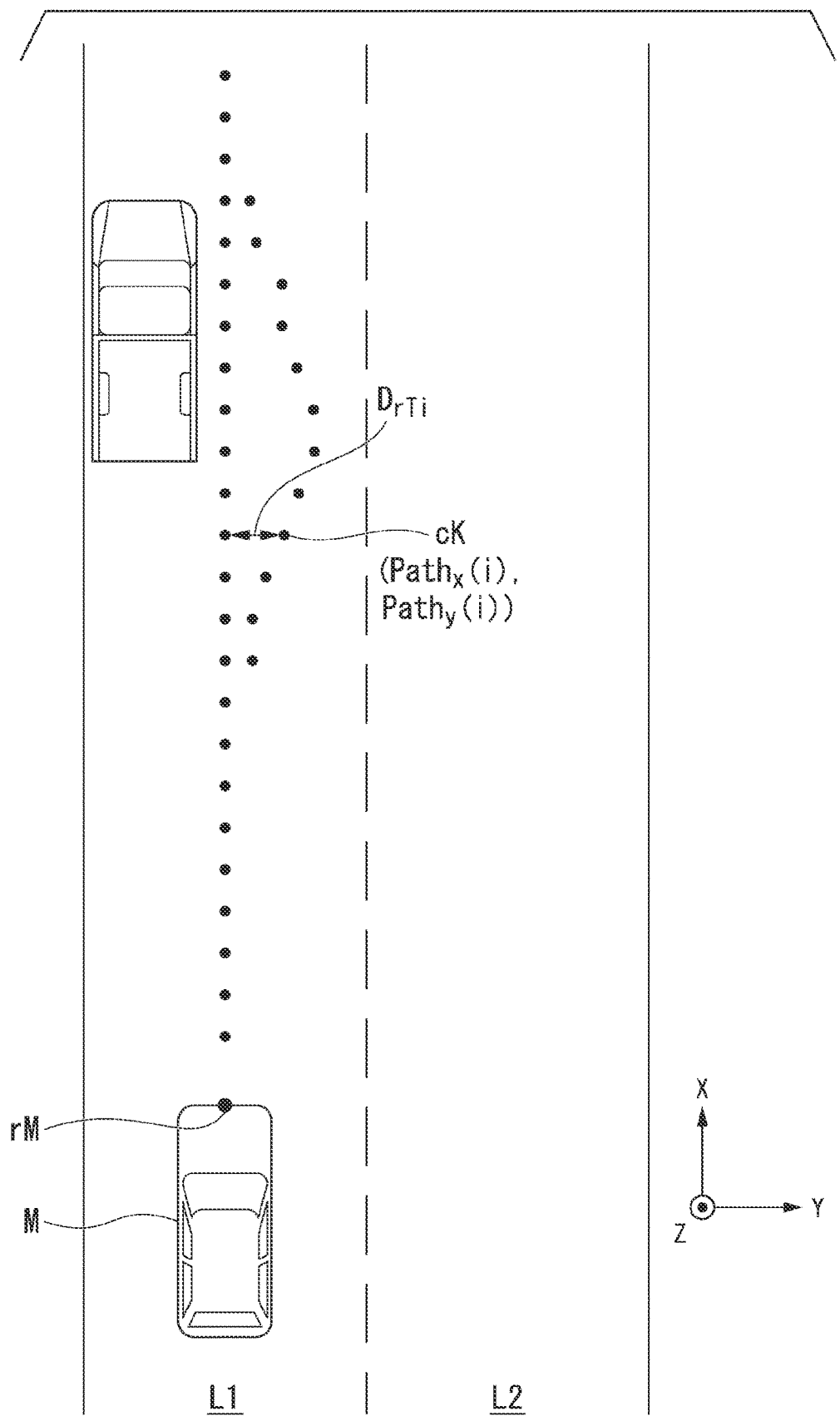
FIG. 9 is a diagram illustrating an example of a method of calculating the second index.

FIG. 9 is a diagram illustrating an example of the method of calculating the second index B. The second index deriver 143 calculates a square of a distance $D_{rTi}$ between a candidate point cK and a candidate point on the base path corresponding to the position in the longitudinal direction as the second index B for each candidate point cK. The distance $D_{rTi}$ is calculated using Expression (3). In the expressions, $\text{Base}_x(i)$ denotes the X coordinate of the i-th candidate point on the base path and $\text{Base}_y(i)$ denotes the Y coordinate of the i-th candidate point on the base path. When a candidate point cK is detected in the lateral direction with respect to the candidate point cK on the base path, $\text{Path}_x(i)-\text{Base}_x(i)$ is zero. When a certain temporary trajectory is set and candidate points constituting the temporary trajectory are cK(i) (i=1, 2, . . . , N), the second index $B_{Path}$ for the temporary trajectory is expressed by Expression (4).

$$D_{rTi} = \sqrt{\{(\text{Path}_x(i)-\text{Base}_x(i))^2 + (\text{Path}_y(i)-\text{Base}_y(i))^2\}} \quad (3)$$

$$B_{Path} = \Sigma_{i=1}^N \{D_{rTi}\} \quad (4)$$

For example, two calculation sequences below can be considered as a calculation sequence including deriving the first index R and the second index B, and any calculation sequence thereof may be employed. A process flow illustrated in FIG. 13 which will be described later is based on the idea of Sequence 2.

(Sequence 1)

Candidates are comprehensively set→the first index R is derived for a line connecting all the candidate points, and the second index B is derived for all the candidate points to be stored in a memory→a temporary trajectory is set→the first index R and the second index B of each candidate point on the temporary trajectory are read from the memory.

(Sequence 2)

Candidate points are set→a temporary trajectory is set→the first index R is derived for a line connecting all the candidate points, and the second index B is derived for the candidate points on the temporary trajectory.

The third index deriver 144 derives a third index by evaluating a shape of a temporary trajectory connecting a plurality of candidate points cK in the longitudinal direction. The target trajectory generator 145 generates a target trajectory on the basis of the first index R, the second index B, and the third index, whereby unnecessary sudden turning of the host vehicle M is curbed.

The third index deriver derives the third index by evaluating smoothness of a temporary trajectory on the basis of some or all of three factors of (1) to (3) which will be described below. In the following description, it is assumed that the third index deriver derives the third index on the basis of all of the three factors, and the three factors are referred to as third indices C1, C2, and C3. A factor t means that a control cycle corresponds to a t-th process while the constituents of the first controller 120 perform processes periodically repeatedly. Now, description will be made with a focus on a process of the t-th control cycle.

Figure 10:
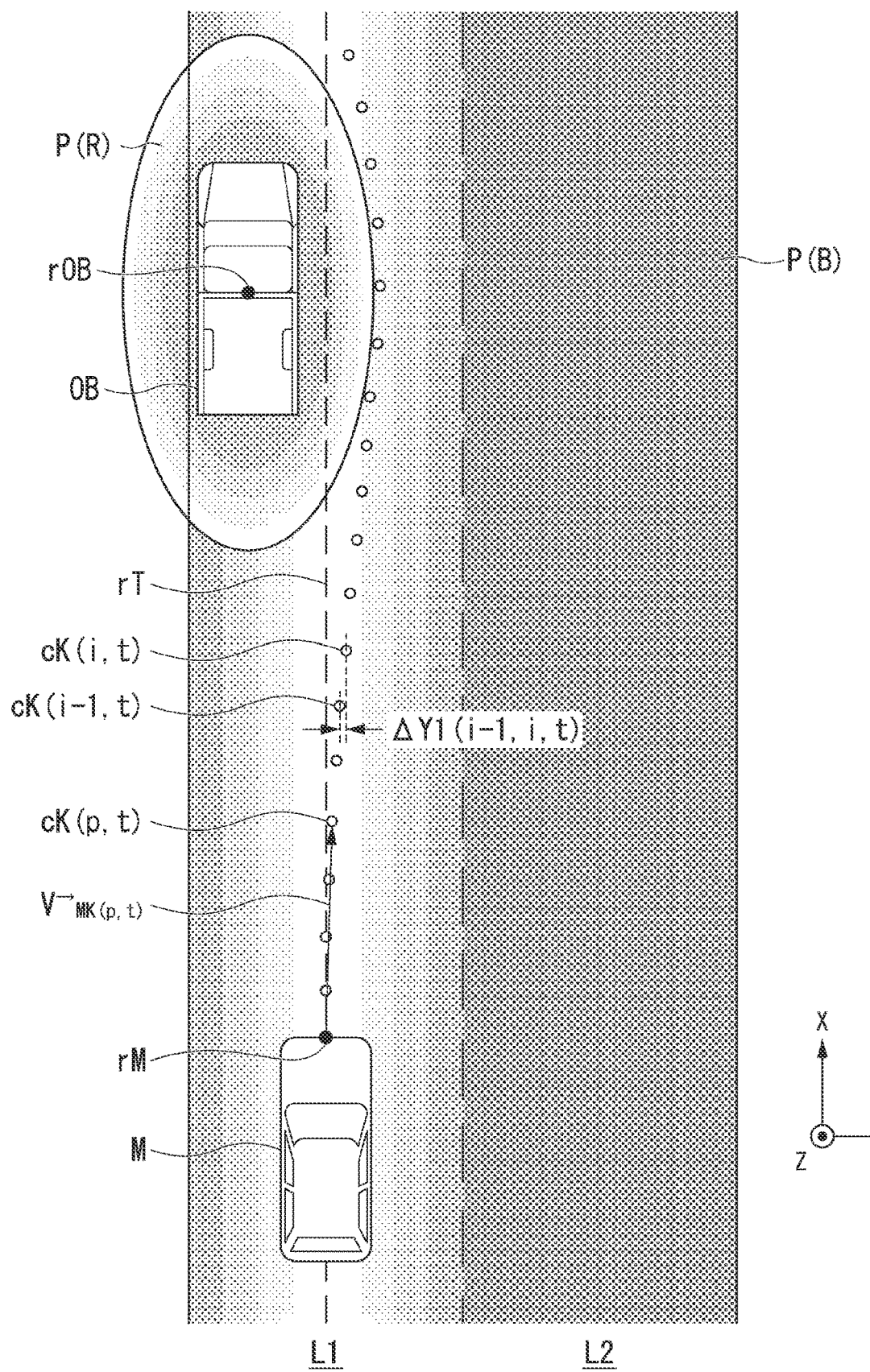
FIG. 10 is a (first) diagram illustrating a third index.

FIG. 10 is a (first) diagram illustrating a third index.

(1) The third index deriver calculates a distance $\Delta Y1(i-1, i, t)$ in the lateral direction between a candidate point $cK(i, t)$ and a candidate point $cK(i-1, t)$ in the t-th control cycle (the current control cycle) for i=1 to N, and derives a square sum thereof as the third index C1 (Expression (5)). For example, $cK(0, t)$ denotes a representative point rM of the host vehicle M. By decreasing the third index C1, it is possible to set a shape of a target trajectory to a simple shape with a small change in the lateral direction and to curb sudden turning of the host vehicle M.

$$C1=\Sigma_{i=1}^{N}\{\Delta Y1(i-1,1,t)^2\} \quad (5)$$

Figure 11:
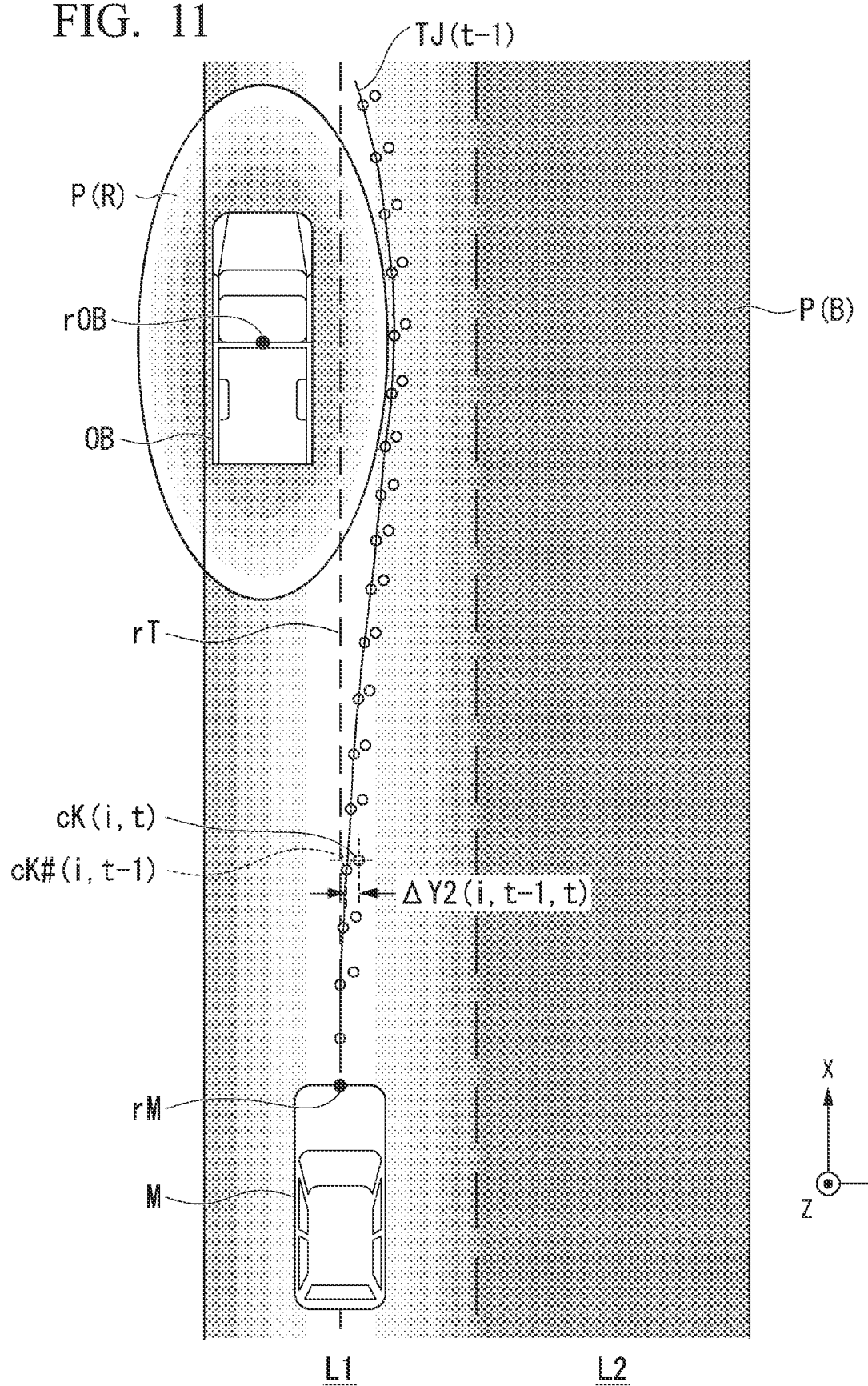
FIG. 11 is a (second) diagram illustrating the third index.

FIG. 11 is a (second) diagram illustrating a third index.

(2) The third index deriver compares a target trajectory TJ(t-c) generated in the (t-C)-th control cycle (a previous control cycle) with candidate points cK(i, t) in the t-th control cycle (the current control cycle), calculates a distance $\Delta Y2(i, t-C, t)$ in the lateral direction between a position cK #(i, t-C) on the target trajectory TJ(t-C) of which the position in the longitudinal direction matches the candidate point cK(i, t) and the candidate point cK(i, C) for i=1 to N, and derives a square sum thereof as the third index C2 (Expression (6)). Since the target trajectory TJ(t-C) is strictly a set of trajectory points K, a polygonal chain connecting the trajectory points K which are continuous in the longitudinal direction is referred to as a target trajectory TJ(t-C). C is a natural number equal to or greater than 1. In the example illustrated in FIG. 11, C=1 is set. By decreasing the third index C2, it is possible to curb temporal change of a target trajectory which is repeatedly generated with the elapse of time and to curb sudden turning of the host vehicle M.

$$C2=\Sigma_{i=1}^{N}\{\Delta Y2(i-1,i-C,t)^2\} \quad (6)$$

FIG. 10 will be referred to for description below.

(3) The third index deriver derives a square of an angle $\theta(\vec{V}_{MK(p,t-E)}, \vec{V}_{MK(p,t)})$ which is formed by a vector $\vec{V}_{MK(p,t)}$ directed from the representative point rM of the host vehicle M to the p-th candidate point cK(p,t) in the t-th control cycle (the current control cycle) and a vector $\vec{V}_{MK(p,t-E)}$ directed from the representative point rM of the host vehicle M to the p-th candidate point cK(p,t-E) in the t-E-th control cycle (the current control cycle) as the third index C3 (Expression (7)). The vectors may be expressed as being "straight lines" but are referred to as vectors. E is a natural number equal to or greater than 1. By decreasing the third index C3, it is possible to curb temporal change of a future point which affects movement of the host vehicle M in the target trajectory and to curb sudden turning of the host vehicle M.

$$C3=\theta^2 \quad (7)$$

The target trajectory generator 145 generates a target trajectory on the basis of the first index R, the second index B, and the third index. For example, the target trajectory generator 145 derives a score by inputting the first index R, the second index B, and the third index to a function, and sets a plurality of candidate points cK in a combination with the smallest value as a plurality of trajectory points K constituting the target trajectory. The score is derived, for example, by calculating a weighted sum of the first index R, the second index B, and the third indices C1, C2, and C3 as expressed by Expression (8). Instead, the score may be derived using an arbitrary method such as multiplying together some or all of the first index R, the second index B, and the third indices as long as the gist of the invention is not changed. "The gist of the invention is not changed" means that a trend to decrease the score as the first index R decreases, to decrease the score as the second index B decreases, and to decrease the score as the third index decreases is maintained. Each of w1, w2, w3, w4, and w5 is an arbitrary positive value.

$$\text{Score}(t)=w1 \times R_{Path}+w2 \times B_{Path}+w3 \times C1+w4 \times C2+w5 \times C3 \quad (8)$$

Through the above process, it is possible to decrease a probability of sudden turning of the host vehicle M in comparison with a case in which a target trajectory is generated on the basis of only the first index R and the second index B. Since the process of generating a target trajectory based on only the first index R and the second index B and the process of evaluating the shape of a trajectory are not separated from each other, it is possible to flexibly generate a target trajectory in various scenes.

An object is not limited to a stationary object and may be an object which moves at a lower speed than that of the host vehicle M such as a bicycle or a pedestrian. In this case, the first index deriver 142 may derive the first index R in consideration of the elapse of time.

Figure 12:
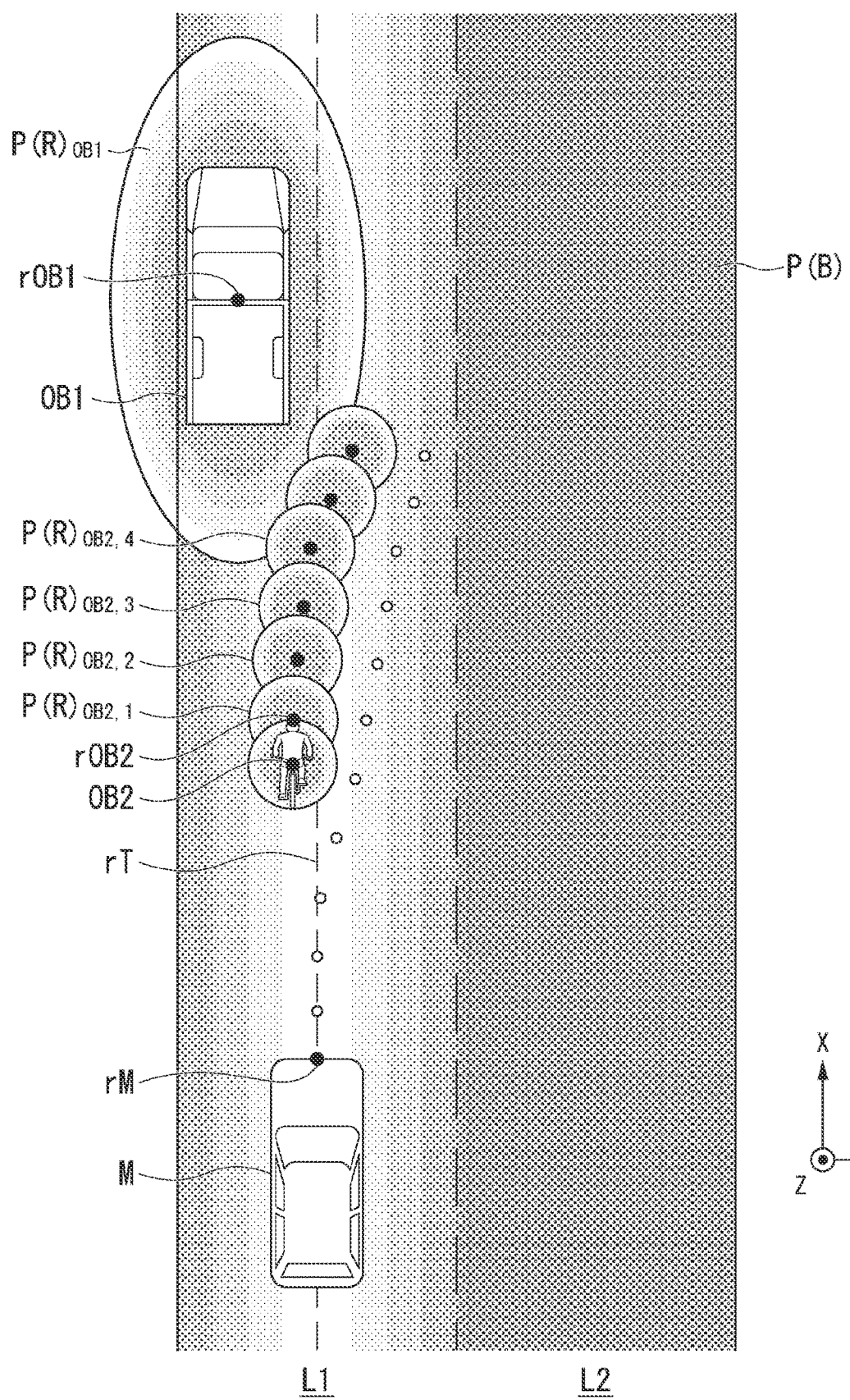
FIG. 12 is a diagram illustrating a target trajectory which is generated for a plurality of objects.

FIG. 12 is a diagram illustrating a target trajectory which is generated for a plurality of objects. In the drawing, OB2 denotes a second object (a bicycle), $P(R)_{OB1}$ denotes a distribution of a first index R corresponding to the first object OB1 and $P(R)_{OB2}$ denotes a distribution of a second index R corresponding to the second object OB2. $P(R)_{OB1}$ has an elliptical shape centered on a representative point rOB1 of the object OB1, and $P(R)_{OB2}$ has a circular shape centered on a position of each destination with movement of a representative point rOB2 of the object OB2. The sizes of the distributions are different from each other, and the first index deriver 142 adjusts the sizes of the distributions, for example, on the basis of the sizes of the objects OB. The first index deriver 142 estimates that a moving route of the representative point rOB2 traces, for example, the outer edge of the distribution of the first index R for the first object OB1, and estimates the future position of the representative point rOB2 on the basis of the current speed of the object OB2. Distributions $P(R)_{OB2,1}$, $P(R)_{OB2,2}$, $P(R)_{OB2,3}$, $P(R)_{OB2,4}$, . . . , $P(R)_{OB2,j}$ of the first index R are set for the future positions of the representative points rOB2. The factor j in $P(R)_{OB2,j}$ is the concept of time having the same period as j of a control cycle time. That is, the factor j denotes after how many control cycles the object OB2 has a position.

The first index deriver 142 may simply overlap the distributions $P(R)_{OB2,1}$, $P(R)_{OB2,2}$, $P(R)_{OB2,3}$, $P(R)_{OB2,4}$, . . . , $P(R)_{OB2}$, of the first index R which are generated as described without considering the time and handle the overlapped distributions as the distribution of the first index R of the second object OB2, or may not consider the distribution of the first index R with a small factor j corresponding to the time required, for example, for arrival at a candidate point cK(k) which has a large k, that is, which is far from the host vehicle M, out of the candidate points cK(k) in consideration of movement of the second object OB2. For example, depending on the speed of the host vehicle M, the first index R may be allocated to candidate points cK(k) in k≥Th1 in consideration of only $P(R)_{OB2,j}$ in j≥Th2.

Figure 13:
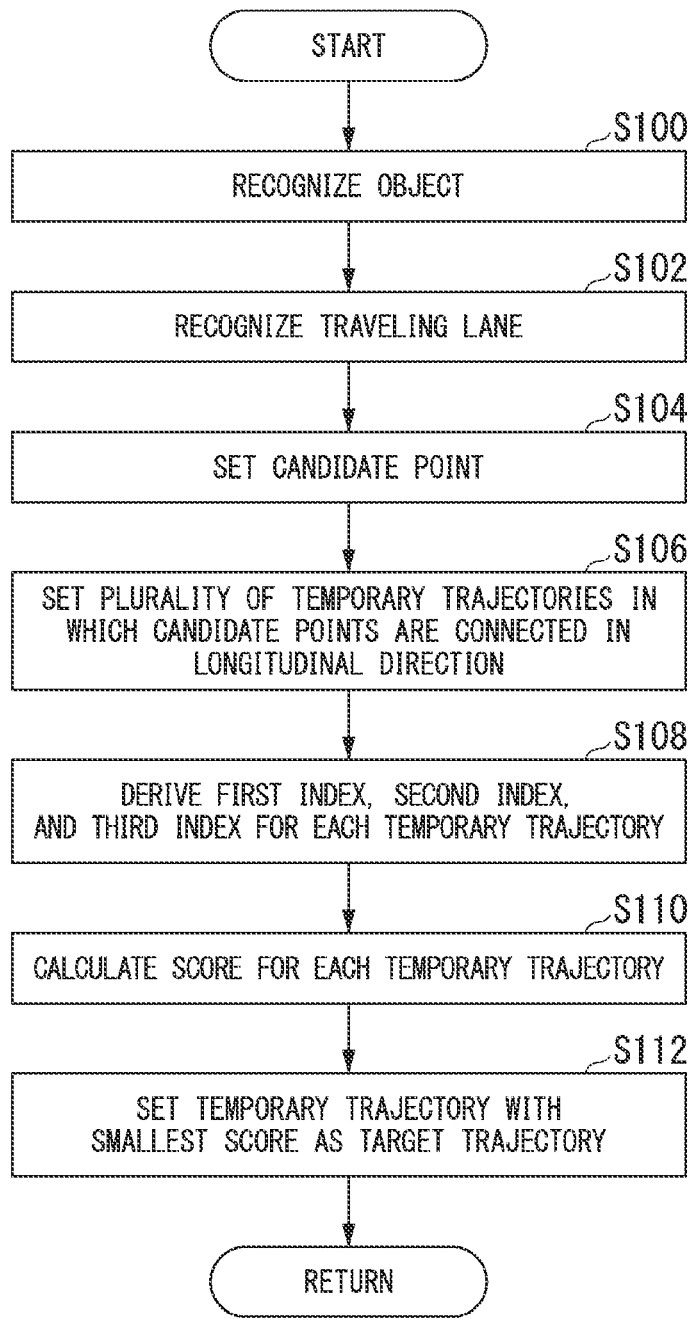
FIG. 13 is a flowchart illustrating an example of a process flow which is performed by the first controller.

FIG. 13 is a flowchart illustrating an example of a process flow which is performed by the first controller 120. The process flow of the flowchart is repeatedly performed for each control cycle time which is described above.

First, the object recognizer 132 recognizes an object in the traveling direction of the host vehicle M (Step S100) and the traveling lane recognizer 134 recognizes the relative position of the traveling lane with respect to the host vehicle M (Step S102).

Then, the candidate point setter 141 sets candidate points (Step S104) and sets a plurality of temporary trajectory in which the candidate points are connected in the longitudinal direction (Step S106).

Then, the first index deriver 142, the second index deriver 143, and the third index deriver 144 derive a first index $R_{Path}$, a second index $B_{Path}$, and the third indices C1 to C3, respectively, for each temporary trajectory (Step S108).

Then, the target trajectory generator 145 calculates the score for each temporary trajectory (Step S110) and sets a temporary trajectory with the smallest score as a target trajectory (Step S112).

Instead of exhaustively selecting provisional trajectories and calculating scores as described above, the automated driving control device 100 may generate a target trajectory by simultaneous perturbation stochastic approximation (SPSA). SPSA is a type of stochastic gradient method using random variables. In this case, the automated driving control device 100 can generate a target trajectory more quickly by applying the score calculation method described above to SPSA compared to the case of exhaustively selecting provisional trajectories.

In the above description, it is assumed that the first index, the second index, and the third index are calculated and the target trajectory is generated by integrating those indices. However, the processing corresponding to the second and third indices may be omitted or modified as appropriate, for example, as long as the first index is obtained by the above-mentioned method.

The automated driving control device 100 according to the first embodiment described above includes: an object recognizer 132 that recognizes an object in the vicinity of the vehicle M; and a movement plan generator 140 that generates a movement plan for the vehicle M, which includes generating a target trajectory in which the vehicle M is to travel and which is obtained by connecting a plurality of trajectory points. The movement plan generator 140 generates a target trajectory so that the line connecting trajectory points adjacent to each other with respect to the traveling direction of the vehicle M does not enter the risk area including the recognized object. Therefore, it is possible to evaluate the target trajectory appropriately and control the vehicle while suppressing the increase in calculation load.

Second Embodiment

A second embodiment will be described below. In the first embodiment, setting of a temporary trajectory is not particularly limited, but in the second embodiment, when an upper limit is provided in the distance ΔY1 (see FIG. 10) in the lateral direction between candidate points cK adjacent in the longitudinal direction and there is any distance ΔY1 greater than the upper limit, the corresponding temporary trajectory is excluded from candidates for a target trajectory. Here, it is assumed that the distance does not have a directional element. That is, a process of excluding a temporary trajectory including a part in which the distance ΔY1 is greater than a threshold value $Th_Y$ from calculation targets of the score in advance is performed as a pre-process. Accordingly, it is possible to further decrease a probability of sudden turning of the host vehicle M.

Figure 14:
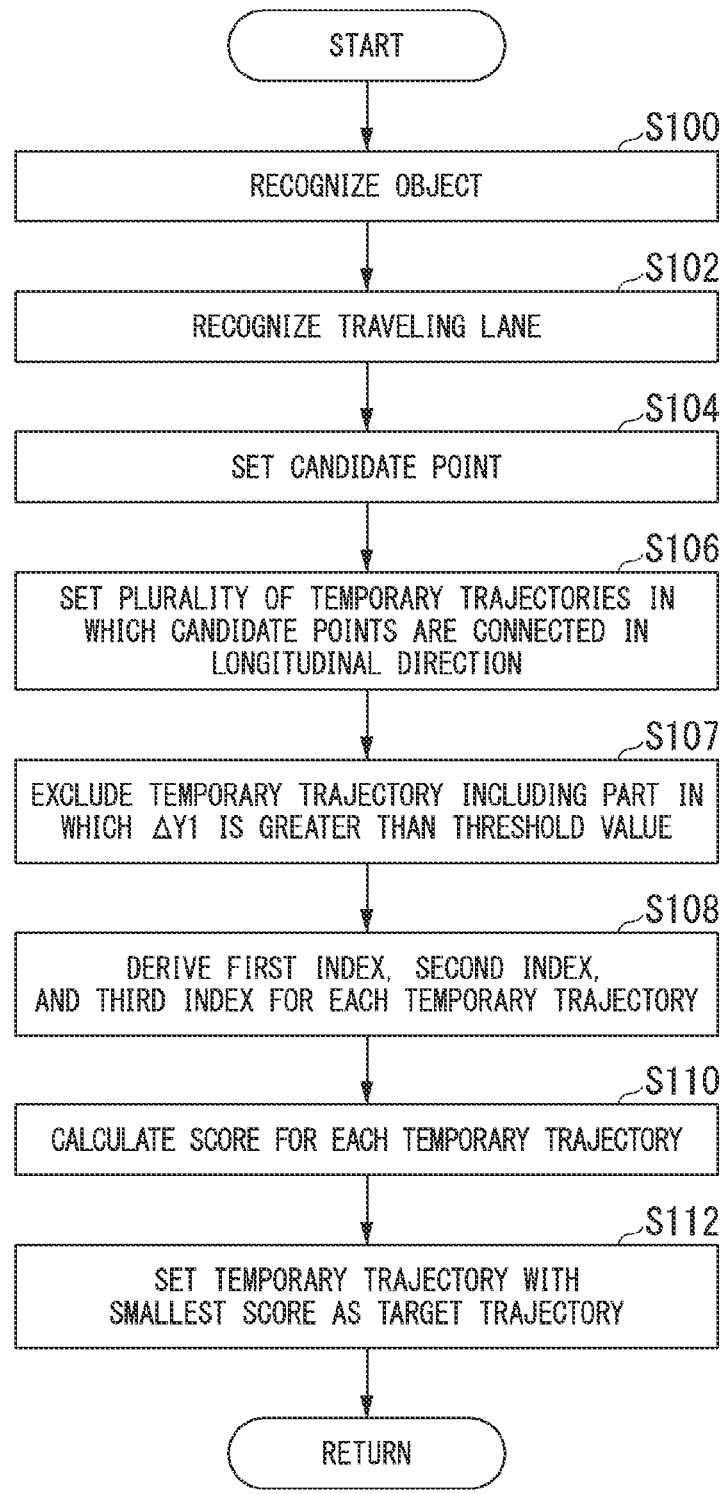
FIG. 14 is a flowchart illustrating an example of a process flow which is performed by the first controller according to a second embodiment.

FIG. 14 is a flowchart illustrating an example of a process flow which is performed by the first controller 120 according to the second embodiment. The process flow in the flowchart is repeatedly performed for each control cycle time which is described above. The processes of Steps S100 to S106 and the processes of Steps S108 to S112 are the same as described above with reference to FIG. 13 and description thereof will be omitted.

Subsequent to the process of Step S106, the candidate point setter 141 excludes a temporary trajectory including a part in which the distance ΔY1 is greater than the threshold value $Th_Y$ from temporary trajectories connecting candidate points in the longitudinal direction (Step S107).

First, instead of comprehensively setting temporary trajectories and excluding a temporary trajectory in which every distance ΔY1 is greater than the threshold value $Th_Y$, a search range (a search angle) may be limited such that the distance ΔY1 is not greater than the threshold value $Th_Y$ when the temporary trajectories are sequentially searched from an end in the longitudinal direction.

According to the second embodiment described above, it is possible to achieve the same advantages as in the first embodiment and to further decrease a probability of sudden turning of the host vehicle M. Since the process of calculating the score is performed after the temporary trajectories are narrowed, it is possible to decrease a process load.

Third Embodiment

A third embodiment will be described below. In the third embodiment, the target trajectory generator 145 ascertains whether a target trajectory selected on the basis of a score includes a part in which the distance ΔY1 is greater than the threshold value $Th_Y$, and corrects the target trajectory such that the distance ΔY1 becomes equal to or less than the threshold value $Th_Y$ when there is a part in which the distance ΔY1 is greater than the threshold value $Th_Y$.

Figure 15:
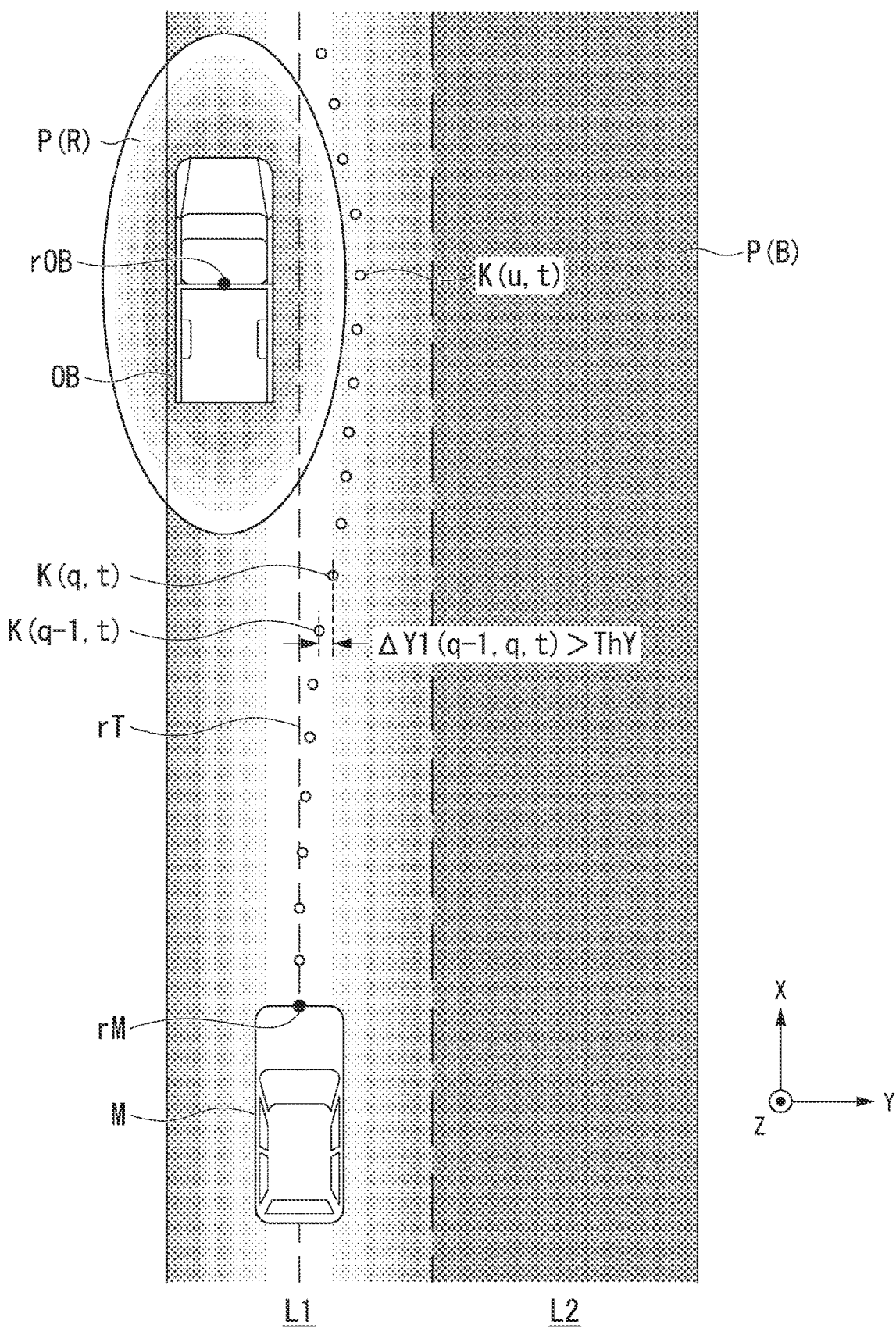
FIG. 15 is a diagram illustrating a process of a target trajectory generator according to a third embodiment.

FIG. 15 is a diagram illustrating a process flow which is performed by the target trajectory generator 145 according to the third embodiment. In the drawing, a q-th trajectory point K(q, t) and a (q−1)-th trajectory point K(q−1, t) have a relationship in which the distance ΔY1 in the lateral direction therebetween is greater than the threshold value $Th_Y$. Since the target trajectory has been generated already, the points are referred to as "trajectory points K" instead of "candidate points cK." In the distance ΔY1 in the third embodiment, candidate points are replaced with trajectory points.

In this case, for example, the target trajectory generator 145 selects an object which is closest to the trajectory point K and corrects the position of the q-th trajectory point K(q, t) or the (q−1)-th trajectory point K(q−1, t) in the lateral direction such that the trajectory point K becomes further away from the representative point of the object. In the example illustrated in FIG. 15, since a representative point rOB of an object OB is located on the left side when seen from a trajectory point K(q), the target trajectory generator 145 moves the position of the (q−1)-th trajectory point K(q−1, t) in a direction in which it becomes further away from the representative point rOB of the object OB, that is, to the right. The target trajectory generator 145 sets, for example, an amount of movement thereof to a minimum amount of movement in which the distance ΔY1 is not greater than the threshold value $Th_Y$. As a result of this process, when the distance in the lateral direction between the (q−1)-th trajectory point K(q−1, t) and the (q−2)-th trajectory point K(q−2, t) is greater than the threshold value Th$_Y$, the target trajectory generator 145 moves the (q−2)-th trajectory point K(q−2, t) to the right. The target trajectory generator 145 according to the third embodiment repeatedly performs this process in a spreading manner until all the distances ΔY1 are equal to or less than the threshold value Th$_Y$.

In this process, it is necessary to determine a trajectory point K at which the distance ΔY1 is first ascertained. If this trajectory point is not determined, there is a likelihood that the process will spread from both sides and will not converge. For example, the target trajectory generator 145 according to the third embodiment sets a trajectory point K with the largest amount of displacement in the lateral direction from the base path (a u-th trajectory point K(u, t) in FIG. 15) as a search start point and ascertains whether the distance ΔY1 is greater than the threshold value ThY to both a near side (a side getting closer to the host vehicle M) and a distant side (a side getting further away from the host vehicle M) from the search start point.

Figure 16:
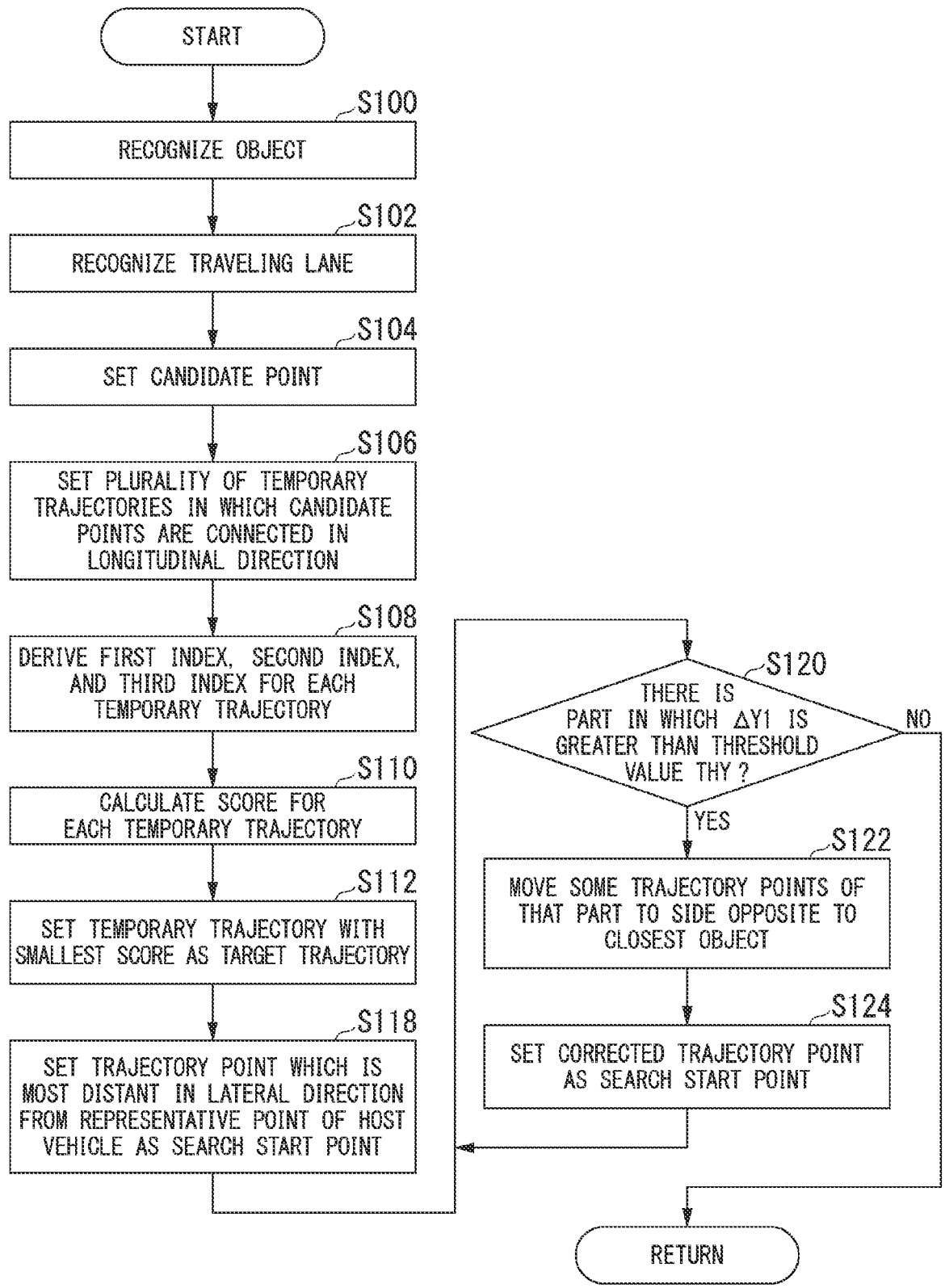
FIG. 16 is a flowchart illustrating an example of a process flow which is performed by the first controller according to the third embodiment.

FIG. 16 is a flowchart illustrating an example of a process flow which is performed by the first controller 120 according to the third embodiment. The process flow in the flowchart is repeatedly performed for each control cycle which is described above. The processes of Steps S100 to S112 are the same as described above with reference to FIG. 13 and description thereof will be omitted.

When a target trajectory is generated, the target trajectory generator 145 sets a trajectory point which is the most distant in the lateral direction from the representative point rM of the host vehicle M as a search start point (Step S118). Then, the target trajectory generator 145 sequentially determines whether there is a part in which the distance ΔY1 is greater than the threshold value Th$_Y$ to both the near side and the distant side from the search start point (Step S120). When it is determined that there is a part in which the distance ΔY1 is greater than the threshold value Th$_Y$, the target trajectory generator 145 moves some trajectory points of the part to the side opposite to the closest object to correct the target trajectory (Step S122). Then, the target trajectory generator 145 sets the corrected trajectory point as the search start point (Step S124) and performs the process of Step S120 again (Step S120). Here, search to the sides opposite to the near side and the distant side is not performed. When there is no part in which the distance ΔY1 is greater than the threshold value Th$_Y$, processing of one control cycle of the flowchart ends.

According to the third embodiment described above, it is possible to achieve the same advantages as in the first embodiment and to further decrease a probability of sudden turning of the host vehicle M.

[Hardware Configuration]

Figure 17:
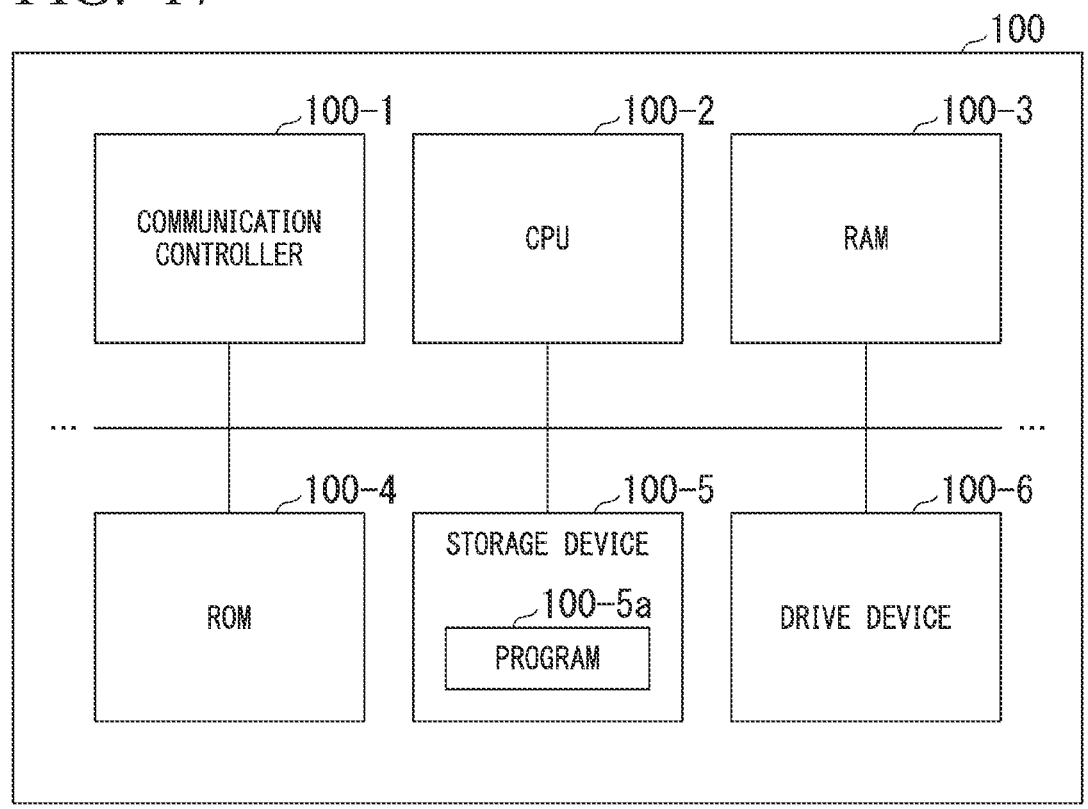
FIG. 17 is a diagram illustrating an example of a hardware configuration of an automated driving control device according to an embodiment.

FIG. 17 is a diagram illustrating an example of a hardware configuration of the automated driving control device 100 according to the embodiment. As illustrated in the drawing, the automated driving control device 100 has a configuration in which a communication controller 100-1, a CPU 100-2, a random access memory (RAM) 100-3 that is used as a work memory, a read only memory (ROM) 100-4 that stores a booting program or the like, a storage device 100-5 such as a flash memory or a hard disk drive (HDD), a drive device 100-6, and the like are connected to each other via an internal bus or a dedicated communication line. The communication controller 100-1 communicates with elements other than the automated driving control device 100. A program 100-5a which is executed by the CPU 100-2 is stored in the storage device 100-5. This program is loaded into the RAM 100-3 by a direct memory access (DMA) controller (not illustrated) or the like and is executed by the CPU 100-2. Accordingly, one or both of the first controller 120 and the second controller 160 are embodied.

While the invention has been described above with reference to an embodiment, the invention is not limited to the embodiment and can be subjected to various modifications and substitutions without departing from the gist of the invention.

What is claimed is:

1. A mobile object control device comprising:
a storage device that stores a program; and
a hardware processor, the hardware processor executing the program stored in the storage device to:
recognize an object which is located near a vehicle;
generate a movement plan for the vehicle, which includes generation of a target trajectory in which the vehicle is to travel and which is obtained by connecting a plurality of trajectory points;
generate, when generating the movement plan, the target trajectory by evaluating a first risk associated with a line which is obtained by connecting trajectory points adjacent to each other with respect to a traveling direction of the vehicle based on a distance between a center of a risk area including the object and the line; and
cause the vehicle to move in the traveling direction based on the movement plan, the first risk associated with the line obtained by connecting the trajectory points, and the risk area inclusive of the object,
wherein the hardware processor further sets the risk area to have an ellipse shape;
performs a deformation processing by converting the ellipse shape to a circle shape for the risk area, the deformation processing comprises shrinking the risk area and the line in a major axis direction of the ellipse shape or enlarging the risk area and the line in a minor axis direction of the ellipse shape;
evaluates, as a value, a closeness of the target trajectory to the object based on a result of the deformation processing;
regenerates the target trajectory based on the value; and
performs, before the deformation processing, rotation processing comprising rotating the risk area and the line around a center of the ellipse shape and matching the major axis and the minor axis of the ellipse shape with axes of a virtual plane,
wherein the evaluating of the first risk between the line and the ellipse shape is achieved through an evaluation of a second risk between the line and the circle shape by evaluating that the line has a conditional risk in response to at least one of a first condition and a second condition being satisfied and a third condition is satisfied,
wherein the first condition specifies that a first angle between a first vector from an endpoint to an other endpoint of the line and a second vector from the end point to the center, and a second angle between a third vector from the other end point to the center are both acute angles,
wherein the second condition specifies that at least one of a first distance between the endpoint and the center and a second distance between the other endpoint and the center are equal to or less than a predetermined value, and wherein the third condition specifies that a distance between the line and the center is equal to or less than the predetermined value.

2. The mobile object control device according to claim 1, wherein the hardware processor sets the risk area to have an ellipse shape.

3. The mobile object control device according to claim 2, wherein the hardware processor performs deformation processing of converting the ellipse shape to a circle for the risk area set to have the ellipse shape, the deformation processing including shrinking the risk area and the line in a major axis direction of the ellipse shape or enlarging the risk area and the line in a minor axis direction of the ellipse shape,
wherein the hardware processor evaluates a degree of closeness of the target trajectory to the object based on a result of performing the deformation processing, and
wherein the hardware processor regenerates the target trajectory based on a result of the evaluation.

4. The mobile object control device according to claim 3, wherein the hardware processor performs, before the deformation processing, rotation processing of rotating the risk area and the line around a center of the ellipse shape and matching the major axis and the minor axis of the ellipse shape with axes of a virtual plane.

5. A mobile object control method to be executed by a computer mounted on a mobile body, the mobile object control method comprising:
recognizing an object which is located near a vehicle;
generating a movement plan for the vehicle, which includes generation of a target trajectory in which the vehicle is to travel and which is obtained by connecting a plurality of trajectory points; and
generating, when generating the movement plan, the target trajectory by evaluating a first risk associated with a line which is obtained by connecting trajectory points adjacent to each other with respect to a traveling direction of the vehicle based on a distance between a center of a risk area including the object and the line;
setting the risk area to have an ellipse shape;
performing deformation processing by converting the ellipse shape to a circle shape for the risk area, the deformation processing comprises shrinking the risk area and the line in a major axis direction of the ellipse shape or enlarging the risk area and the line in a minor axis direction of the ellipse shape;
evaluating, as a value, a closeness of the target trajectory to the object based on a result of the deformation processing;
regenerating the target trajectory based on the value; and
performing, before the deformation processing, rotation processing comprising rotating the risk area and the line around a center of the ellipse shape and matching the major axis and the minor axis of the ellipse shape with axes of a virtual plane,
wherein the evaluating of the first risk between the line and the ellipse shape is achieved through an evaluation of a second risk between the line and the circle shape by evaluating that the line has a conditional risk in response to at least one of a first condition and a second condition being satisfied and a third condition is satisfied,
wherein the first condition specifies that a first angle between a first vector from an endpoint to an other endpoint of the line and a second vector from the end point to the center, and a second angle between a third vector from the other end point to the center are both acute angles,
wherein the second condition specifies that at least one of a first distance between the endpoint and the center and a second distance between the other endpoint and the center are equal to or less than a predetermined value, and
wherein the third condition specifies that a distance between the line and the center is equal to or less than the predetermined value; and
causing the vehicle to move in the traveling direction based on the movement plan, the first risk associated with the line obtained by connecting the trajectory points, and the risk area inclusive of the object.

6. A computer-readable non-transitory storage medium that stores a program for causing a computer mounted on a mobile body to:
recognize an object which is located near a vehicle;
generate a movement plan for the vehicle, which includes generation of a target trajectory in which the vehicle is to travel and which is obtained by connecting a plurality of trajectory points;
generate, when generating the movement plan, the target trajectory by evaluating a first risk associated with a line which is obtained by connecting trajectory points adjacent to each other with respect to a traveling direction of the vehicle based on a distance between a center of a risk area including the object and the line;
set the risk area to have an ellipse shape;
perform a deformation processing by converting the ellipse shape to a circle shape for the risk area, the deformation processing comprises shrinking the risk area and the line in a major axis direction of the ellipse shape or enlarging the risk area and the line in a minor axis direction of the ellipse shape;
evaluate, as a value, a closeness of the target trajectory to the object based on a result of the deformation processing;
regenerate the target trajectory based on the value; and
perform, before the deformation processing, rotation processing comprising rotating the risk area and the line around a center of the ellipse shape and matching the major axis and the minor axis of the ellipse shape with axes of a virtual plane,
wherein the evaluating of the first risk between the line and the ellipse shape is achieved through an evaluation of a second risk between the line and the circle shape by evaluating that the line has a conditional risk in response to at least one of a first condition and a second condition being satisfied and a third condition is satisfied,
wherein the first condition specifies that a first angle between a first vector from an endpoint to an other endpoint of the line and a second vector from the end point to the center, and a second angle between a third vector from the other end point to the center are both acute angles,
wherein the second condition specifies that at least one of a first distance between the endpoint and the center and a second distance between the other endpoint and the center are equal to or less than a predetermined value, and wherein the third condition specifies that a distance between the line and the center is equal to or less than the predetermined value; and
cause the vehicle to move in the traveling direction based on the movement plan, the first risk associated with the line obtained by connecting the trajectory points, and the risk area inclusive of the object.

7. A mobile object control device comprising:
a storage device that stores a program; and
a processor that executes the program stored in the storage device to:
recognize an object which is located near a vehicle;
generate a movement plan for the vehicle, which includes generation of a target trajectory in which the vehicle is to travel and which is obtained by connecting a plurality of trajectory points;
generate, when generating the movement plan, the target trajectory by evaluating a first risk associated with a line which is obtained by connecting trajectory points adjacent to each other with respect to a traveling direction of the vehicle based on a distance between a center of a risk area including the object and the line;
set the risk area to have an ellipse shape;
perform a deformation processing by converting the ellipse shape to a circle shape for the risk area, the deformation processing comprises shrinking the risk area and the line in a major axis direction of the ellipse shape or enlarging the risk area and the line in a minor axis direction of the ellipse shape;
evaluate, as a value, a closeness of the target trajectory to the object based on a result of the deformation processing;
regenerate the target trajectory based on the value; and
perform, before the deformation processing, rotation processing comprising rotating the risk area and the line around a center of the ellipse shape and matching the major axis and the minor axis of the ellipse shape with axes of a virtual plane,
wherein the evaluating of the first risk between the line and the ellipse shape is achieved through an evaluation of a second risk between the line and the circle shape by evaluating that the line has a conditional risk in response to at least one of a first condition and a second condition being satisfied and a third condition is satisfied,
wherein the first condition specifies that a first angle between a first vector from an endpoint to an other endpoint of the line and a second vector from the end point to the center, and a second angle between a third vector from the other end point to the center are both acute angles,
wherein the second condition specifies that at least one of a first distance between the endpoint and the center and a second distance between the other endpoint and the center are equal to or less than a predetermined value, and
wherein the third condition specifies that a distance between the line and the center is equal to or less than the predetermined value; and
cause the vehicle to move in the traveling direction based on the movement plan, the first risk associated with the line obtained by connecting the trajectory points, and the risk area inclusive of the object.

* * * * *